(12) United States Patent
Vigano et al.

(10) Patent No.: US 10,704,322 B2
(45) Date of Patent: Jul. 7, 2020

(54) SIGNAL DISTRIBUTION NETWORKS FOR OPTICALLY SWITCHABLE WINDOWS

(71) Applicant: View, Inc., Milpitas, CA (US)

(72) Inventors: Jose Vigano, Milpitas, CA (US); Stephen C. Brown, San Mateo, CA (US); Dhairya Shrivastava, Los Altos, CA (US); Kevin Kazuo Kaneshiro, San Jose, CA (US)

(73) Assignee: View, Inc., Milpitas, CA (US)

( * ) Notice: Subject to any disclaimer, the term of this patent is extended or adjusted under 35 U.S.C. 154(b) by 0 days.

(21) Appl. No.: 16/295,142

(22) Filed: Mar. 7, 2019

(65) Prior Publication Data

US 2019/0203528 A1    Jul. 4, 2019

Related U.S. Application Data

(63) Continuation of application No. 15/268,204, filed on Sep. 16, 2016, now Pat. No. 10,253,558.

(60) Provisional application No. 62/220,514, filed on Sep. 18, 2015.

(51) Int. Cl.
    *E06B 9/24* (2006.01)
    *G02F 1/163* (2006.01)
(52) U.S. Cl.
    CPC ........ *E06B 9/24* (2013.01); *E06B 2009/2464* (2013.01); *G02F 1/163* (2013.01)
(58) Field of Classification Search
    USPC .......................................... 307/115; 361/826
    See application file for complete search history.

(56) References Cited

U.S. PATENT DOCUMENTS

| 4,553,085 A | 11/1985 | Canzano |
| 5,242,313 A | 9/1993 | Logerot et al. |
| 5,477,152 A | 12/1995 | Hayhurst |
| 6,055,089 A | 4/2000 | Schulz et al. |

(Continued)

FOREIGN PATENT DOCUMENTS

| CN | 205743507 U | 11/2016 |
| FR | 2643512 A1 | 8/1990 |

(Continued)

OTHER PUBLICATIONS

U.S. Office Action dated Apr. 16, 2018 for U.S. Appl. No. 15/268,204.

(Continued)

*Primary Examiner* — Rexford N Barnie
*Assistant Examiner* — Xuan Ly
(74) *Attorney, Agent, or Firm* — Weaver Austin Villeneuve & Sampson LLP

(57) ABSTRACT

Various embodiments herein relate to power distribution networks for optically switchable windows. A number of different topologies are provided. In many embodiments, a control panel may be connected with a trunk line, which is connected to a plurality of optically switchable windows. The plurality of optically switchable windows may be powered by the shared trunk line. This topology provides substantial improvements over topologies in which each optically switchable window is connected to the control panel via separate, individual lines. Further, certain embodiments herein relate to installation kits for installing power distribution networks for optically switchable windows.

24 Claims, 21 Drawing Sheets

(56) References Cited

U.S. PATENT DOCUMENTS

| | | | |
|---|---|---|---|
| 6,084,758 | A | 7/2000 | Clarey et al. |
| 6,232,557 | B1 | 5/2001 | Lounsbury et al. |
| 6,344,748 | B1 | 2/2002 | Gannon |
| 6,707,590 | B1 | 3/2004 | Bartsch |
| 7,672,104 | B2 | 3/2010 | Reynolds et al. |
| 8,140,276 | B2 | 3/2012 | Walters et al. |
| 8,213,074 | B1* | 7/2012 | Shrivastava ............ E06B 9/24 359/275 |
| 8,800,221 | B1 | 8/2014 | Header |
| 9,250,494 | B2 | 2/2016 | Podbelski et al. |
| 9,454,055 | B2 | 9/2016 | Brown et al. |
| 10,253,558 | B2 | 4/2019 | Vigano et al. |
| 10,365,532 | B2 | 7/2019 | Vigano et al. |
| 2003/0072144 | A1* | 4/2003 | Malkowski, Jr. ...... H02B 1/202 361/826 |
| 2006/0158805 | A1 | 7/2006 | Malvino |
| 2007/0188841 | A1 | 8/2007 | Moeller et al. |
| 2011/0046810 | A1 | 2/2011 | Bechtel et al. |
| 2011/0255142 | A1 | 10/2011 | Ash et al. |
| 2011/0304899 | A1 | 12/2011 | Kwak et al. |
| 2012/0275008 | A1 | 11/2012 | Pradhan et al. |
| 2012/0293855 | A1 | 11/2012 | Shrivastava et al. |
| 2013/0271812 | A1 | 10/2013 | Brown et al. |
| 2013/0271814 | A1 | 10/2013 | Brown |
| 2014/0236323 | A1 | 8/2014 | Brown et al. |
| 2014/0268287 | A1 | 9/2014 | Brown et al. |
| 2014/0330538 | A1 | 11/2014 | Conklin et al. |
| 2014/0349497 | A1 | 11/2014 | Brown et al. |
| 2014/0368899 | A1* | 12/2014 | Greer .................... G05B 15/02 359/275 |
| 2015/0060648 | A1 | 3/2015 | Brown et al. |
| 2015/0109653 | A1 | 4/2015 | Greer et al. |
| 2015/0219975 | A1 | 8/2015 | Phillips et al. |
| 2015/0253367 | A1 | 9/2015 | Flammer, III et al. |
| 2015/0378231 | A1 | 12/2015 | Greer et al. |
| 2016/0054633 | A1 | 2/2016 | Brown et al. |
| 2016/0054634 | A1 | 2/2016 | Brown et al. |
| 2016/0124283 | A1 | 5/2016 | Brown et al. |
| 2016/0154290 | A1 | 6/2016 | Brown et al. |
| 2017/0075183 | A1 | 3/2017 | Brown |
| 2017/0075323 | A1 | 3/2017 | Shrivastava et al. |
| 2017/0082903 | A1 | 3/2017 | Vigano et al. |
| 2017/0097259 | A1 | 4/2017 | Brown et al. |
| 2017/0122802 | A1 | 5/2017 | Brown et al. |
| 2017/0131610 | A1 | 5/2017 | Brown et al. |
| 2017/0146884 | A1 | 5/2017 | Vigano et al. |
| 2017/0212400 | A1 | 7/2017 | Shrivastava et al. |
| 2017/0285433 | A1 | 10/2017 | Shrivastava et al. |
| 2018/0129172 | A1 | 5/2018 | Shrivastava et al. |
| 2019/0294017 | A1 | 9/2019 | Vigano et al. |

FOREIGN PATENT DOCUMENTS

| | | |
|---|---|---|
| WO | WO2006/089718 A2 | 8/2006 |
| WO | WO2017/059362 A1 | 4/2007 |
| WO | WO2013/055457 A1 | 4/2013 |
| WO | WO2014/102198 A1 | 7/2014 |
| WO | WO2015/134789 A1 | 9/2015 |
| WO | WO2015/171886 A1 | 11/2015 |
| WO | WO2016/004109 A1 | 1/2016 |
| WO | WO2017/007841 A1 | 1/2017 |
| WO | WO2017/007942 A1 | 1/2017 |
| WO | WO2018/019473 A1 | 2/2018 |
| WO | WO2018/112095 A2 | 6/2018 |
| WO | WO2018/152249 A1 | 8/2018 |
| WO | WO2019/203931 | 10/2019 |

OTHER PUBLICATIONS

U.S. Notice of Allowance dated Nov. 29, 2018 for U.S. Appl. No. 15/268,204.
U.S. Office Action dated Nov. 30, 2018 for U.S. Appl. No. 15/365,685.
International Search Report and Written Opinion (ISA/KR) dated Dec. 16, 2016 in PCT Application No. PCT/US2016/052211.
International Preliminary Report on Patentability dated Mar. 29, 2018 in PCT Application No. PCT/US2016/052211.
International Search Report and Written Opinion (ISA/KR) dated Apr. 2, 2018 in PCT Application No. PCT/US2017/061054.
International Search Report and Written Opinion (ISA/KR) dated May 23, 2018 in PCT Application No. PCT/US2018/018241.
View Inc., Installation Description, Tintable Electrochromic Windows and an Associated Power Distribution Network, prior to Sep. 2014 (3 pages).
Vinci Construction Datasheet for "Horizon-Solar Connected Window", Dec. 2016 (2 pp).
U.S. Notice of Allowance dated Apr. 26, 2019 for U.S. Appl. No. 15/365,685.
International Search Report and Written Opinion (ISA/KR) dated Jun. 14, 2019 in PCT/US2019/019455.
European Extended Search Report dated Apr. 18, 2019 in EP Application No. 16847427.8.
International Preliminary Report on Patentability dated Jun. 13, 2019 in PCT Application No. PCT/US2017/061054.
International Preliminary Report on Patentability dated Aug. 29, 2019 in PCT Application No. PCT/US2018/018241.
"Automated Power-Distribution System," NASA Tech Brief, US Department of Commerce, Springfield, VA, Feb. 1991, p. 128 (2 pp).
"DeviceNet Media—Design and Installation Guide," Rockwell Automation et al., Jul. 2004, XP002384552, <http://literature.rockwellautomation.com/ids/groups/literature/documents/um/dnet-um072_-en-p. pdf> [retrieved Jun. 9, 2006].
U.S. Appl. No. 16/439,376, filed Jun. 12, 2019, Vigano et al.
U.S. Appl. No. 16/486,113, filed Aug. 14, 2019, Tinianov et al.
U.S. Office Action dated Mar. 16, 2020 for U.S. Appl. No. 16/439,376.
Taiwanese Office Action dated Mar. 23, 2020 in TW Application No. 105130239.

* cited by examiner

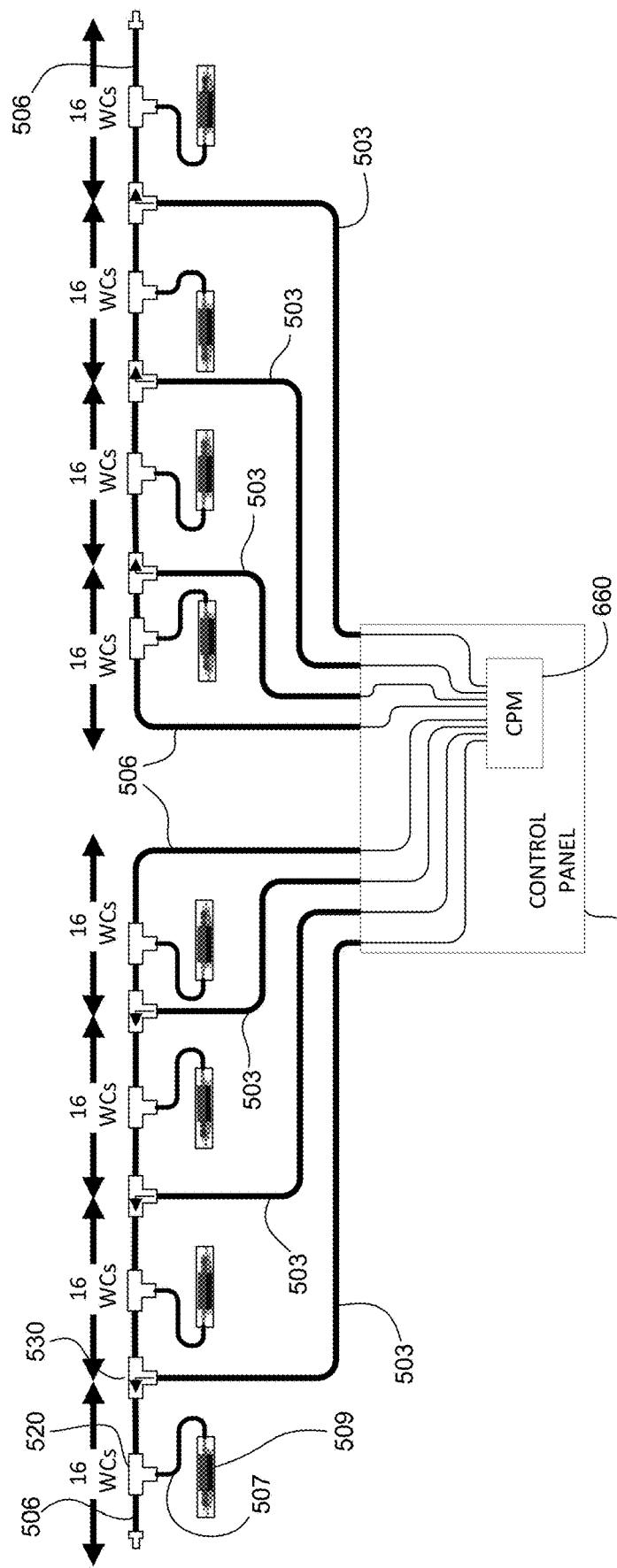

SIGNAL DISTRIBUTION NETWORKS FOR OPTICALLY SWITCHABLE WINDOWS

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Optically switchable windows exhibit a controllable and reversible change in an optical property when placed in a different state, which may be driven by a controllable stimulus such as a voltage change. The optical property is typically one or more of color, transmittance, absorbance, and reflectance. Electrochromic devices are sometimes used in optically switchable windows. One well-known electrochromic material, for example, is tungsten oxide ($WO_3$). Tungsten oxide is a cathodic electrochromic material in which a coloration transition, transparent to blue, occurs by electrochemical reduction.

Electrically switchable windows, whether electrochromic or otherwise, may be used in buildings to control transmission of solar energy. Switchable windows may be manually or automatically tinted and cleared to reduce energy consumption, by heating, air conditioning and/or lighting systems, while maintaining occupant comfort.

Only recently have designers begun developing control and power systems for buildings having many electrically tintable windows. As a consequence, many developments are required before such systems can operate reliably and approach their potential.

SUMMARY

The embodiments herein relate to networks of electrochromic windows or other electrochromic devices. For example, a power distribution network for providing power to multiple optically switchable windows in a building may be characterized by the following elements: (a) a control panel comprising one or more power supplies electrically connected to a main power supply for the building, and one or more ports connected to the one or more power supplies such that the power supplies provide power to the one or more ports, wherein the power from the power supplies is suitable for the power distribution network to provide power to at least some of the optically switchable windows and drive optical transitions of those optically switchable windows; (b) at least one power insert line connected to a port of the control panel and extending toward the multiple optically switchable windows, wherein the power insert line comprises a cable for supplying power to the multiple optically switchable windows; (c) a trunk line comprising a plurality of conductors and connected between the power insert line and multiple drop lines, wherein each drop line is configured to provide power from the trunk line to one or more optically switchable windows; and (d) a plurality of connectors between the multiple drop lines and the trunk line, wherein each connector provides an electrical path between the trunk line and its respective drop line in a manner that does not sever the conductors of the trunk line. In some embodiments, the optically switchable windows are electrochromic devices on transparent substrates. In certain embodiments, the one or more power supplies of the control panel are DC power supplies.

The trunk line may include flat cable portions at the connectors. The trunk line may be a flat cable. The connectors may be insulation displacement connectors. The power distribution network may additionally include a secondary power insert line connected between the control panel and the trunk line, wherein the secondary power insert line connects with the trunk line at a location between a location where the at least one power insert line connects with the trunk line and the location of a terminal optically switchable window. In some implementations, the network has fewer power insert lines than optically switchable windows.

In certain embodiments, the power distribution network additionally includes a plurality of window controllers coupled between the optically switchable windows and the drop lines, wherein the window controllers comprise circuitry for delivering electrical power to the optically switchable windows and driving optical transitions of the optically switchable windows. The window controllers may be designed or configured to include instructions for ramping and holding electrical power to the optically switchable windows to drive the optical transitions.

In some implementations, the power delivered by the power distribution network is class 2. In some implementations, the one or more power supplies of the control panel are class 1 power supplies. In certain embodiments, the trunk line is located in channels of mullions and/or transoms. Optionally, such trunk line is class 2 cable that carries class 1 electrical power during operation.

In various embodiments, the power distribution network additionally includes a remote power panel disposed at location, when compared to the location of the control panel, which is closer to the one or more of the optically switchable windows.

In certain embodiments, a power distribution network for providing electricity to a plurality of optically switchable windows, the power distribution network includes: (a) a control panel including one or more power supplies electrically connected to a main power supply for a building, each power supply including one or more power ports for delivering electricity to the plurality of switchable windows via; (b) a trunk line configured to supply electricity from the one or more power ports to; (c) one or more drop lines, each drop line configured to supply electricity to at least one window controller, said at least one window controller electrically connected to one or more of the plurality of switchable windows; and (d) at least one power insert line configured to deliver auxiliary power from said one or more power ports and into the trunk line at a position either between two drop line connection points or between a drop line connection point and a power port. In one embodiment, the control panel includes a control panel monitor. In one embodiment, the trunk line is a segmented system including one or more T-connectors, Y-connectors and power taps.

Some aspects of this disclosure pertain to kits for installing a power distribution network for providing power to multiple optically switchable windows in a building. Such kits may be characterized by the following features: (a) a control panel comprising (i) one or more power supplies for electrically connecting to a main power supply for the building, and (ii) one or more ports connected to the one or more power supplies such that the power supplies can provide power to the one or more ports; (b) at least one power insert line for connecting to a port of the control panel and extending toward the multiple optically switchable windows, wherein the power insert line comprises a cable for supplying power to multiple optically switchable windows; (c) a trunk line comprising a plurality of conductors for connecting between the power insert line and multiple drop lines, (d) the multiple drop lines, wherein each drop line is configured to be electrically connected to an optically switchable window to provide power from the trunk line to its optically switchable window for driving transitions of the optically switchable window; and (e) a plurality of connectors for providing electrical paths between the trunk line and the drop lines. Some kits additionally include one or more optically switchable windows, which may be electrochromic devices on transparent substrates. In some embodiments, the trunk line is class 2 cable.

In some kits, at least some of the connectors are configured such that they provide the electrical path between the trunk line and the drop lines in a manner that does not sever the conductors of the trunk line. In some kits, a trunk line includes flat cable portions at locations where the connectors can be attached. In some kits at least one trunk line is a flat cable. In some kits, some of the connectors are insulation displacement connectors.

Some kits additionally include a secondary power insert line for connecting the control panel and the trunk line. In some kits, the control panel has no side with a dimension greater than about 30 inches. In some kits, the control panel power supplies are class 2 power supplies.

Some kits include a plurality of window controllers configured to be coupled between the optically switchable windows and the drop lines, which window controllers include circuitry for delivering electrical power to the optically switchable windows and driving optical transitions of the optically switchable windows. One or more of the window controllers may include instructions for ramping and holding electrical power to the optically switchable windows to drive the optical transitions.

Some kits additionally include a remote power panel configured to receive power from the building's main power supply and deliver class 2 rated power to the power distribution network. In some kits, one or more power supplies of the control panel are class 2 power supplies.

These and other features and advantages of the disclosed embodiments will be described in further detail below, with reference to the associated drawings.

BRIEF DESCRIPTION OF THE DRAWINGS

The following detailed description can be more fully understood when considered in conjunction with the drawings in which:

FIG. 6K depicts a schematic view of another embodiment of a power distribution network utilizing a control panel that includes a control panel monitor.

DETAILED DESCRIPTION

Figure 1:
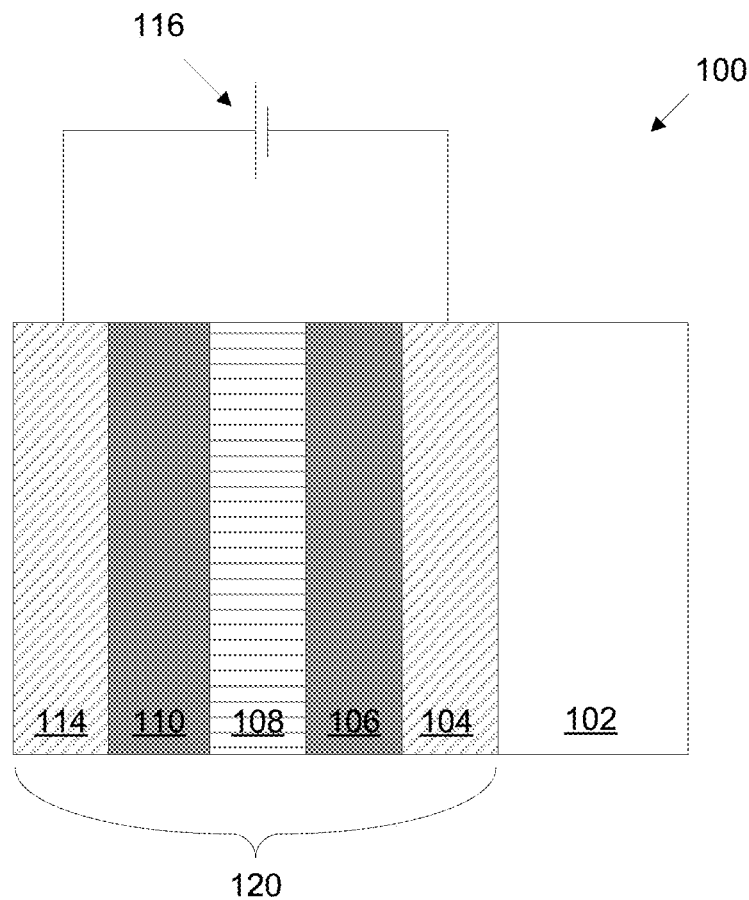
FIG. 1 illustrates a cross sectional view of an electrochromic device according to certain embodiments.

Electrochromic devices can be incorporated into windows to form electrochromic windows. Electrochromic windows are useful for controlling the amount of light and heat that enter a building through the windows, and can be used to minimize the amount of energy used to maintain the building at a comfortable temperature for occupants. Electrochromic windows are also useful in minimizing undesirable lighting conditions (e.g., glare) inside a building.

Where multiple optically switchable windows, such as electrochromic windows, are provided together in an installation, such windows may be networked together. The network may provide power and/or communication information to each of the windows. Installation and maintenance of optically switchable windows, particularly in a network, present certain issues that are not relevant when installing passive windows. For instance, electrochromic windows are configured to receive power to drive optical transitions on the windows. As such, a power distribution network may be configured to provide power to each of the windows. Similarly, a communication network (which may or may not share certain components of the power distribution network) may be configured to provide communication/control information to each of the windows to control when and how each window undergoes an optical transition. By contrast, passive windows do not receive power or control information, and are not typically networked together in any way. Similarly, when a building is upgraded to include additional windows, such upgrades will be more complicated if the windows are electrochromic. In various conventional cases where a network of electrochromic windows is installed, it is difficult to add additional windows due to limitations inherent in the installed network. Such limitations may relate to power/voltage/current/safety limitations, for example.

Network Challenges

Networks of optically switchable windows may be used in various cases. Networks are particularly beneficial in large buildings and buildings having large numbers of optically switchable windows. Networks may deliver power and/or communication/control information. A network that delivers power may be referred to as a power distribution network. A network that delivers communication/control information may be referred to as a communication network. In various cases a network may be both a power distribution network and a communication network. In such cases, various components within the network may operate to distribute power and/or communication. In other words, where a network distributes both power and communication, certain components may distribute only power, certain components may distribute only communication information, and certain components may distribute both power and communication information. In Power-line communications (PLC), both power and communications are transmitted on a single conductor. See e.g., IEEE 1901 and 1905. Various examples are provided herein. While many of the examples herein are focused on power distribution networks, it should be understood that such networks may also be communication networks, and/or may share certain components with a communication network.

With respect to power distribution, networks of electrochromic windows present several design challenges. One challenge relates to delivering sufficient power to each window such that each window can perform all desired transitions, regardless of how far removed such window is from its power source. Another challenge relates to minimization of cabling installed throughout a building. It is generally preferable to use less cabling, so long as all the windows can receive sufficient power. Using less cabling saves costs on both materials and installation. A related challenge is the relative ease/difficulty of installation. Most typical (non-electrochromic) window installers are not accustomed to running cabling throughout a building to bring power to the windows. As such, any improvements that can be made to make such installation easier and/or more flexible are beneficial. The use of less cabling makes installation easier because there is less time and energy spent pulling cables throughout a building. Another factor that affects the difficulty of installing a network of electrochromic windows is the particular design of the power distribution network and whether the network (or any portions thereof) needs to be installed by specialized personnel such as a licensed electrician. Much of the labor in installing electrochromic windows can be handled by ordinary contractors. However, there may be certain steps that need to be performed by licensed electricians. The use of licensed electricians may result in higher costs and/or delayed installation compared to cases where relatively more of the installation work is done by ordinary contractors.

Switchable Window Technology

Typically, an "optically switchable device" is a thin film device that changes optical state in response to electrical input. The thin film device is generally supported by some sort of substrate, e.g. glass or other transparent material. The device reversibly cycles between two or more optical states. Switching between these states is controlled by applying predefined current and/or voltage to the device. The device typically includes two thin conductive sheets that straddle at least one optically active layer. The electrical input driving the change in optical state is applied to the thin conductive sheets. In certain implementations, the input is provided by bus bars in electrical communication with the conductive sheets.

While the disclosure emphasizes electrochromic devices as examples of optically switchable devices, the disclosure is not so limited. Examples of other types of optically switchable device include certain electrophoretic devices, liquid crystal devices, and the like. Optically switchable devices may be provided on various optically switchable products, such as optically switchable windows. However, the embodiments disclosed herein are not limited to switchable windows. Examples of other types of optically switchable products include mirrors, displays, and the like. In the context of this disclosure, these products are typically provided in a non-pixelated format.

A schematic cross-section of an electrochromic device 100 in accordance with some embodiments is shown in FIG. 1. The electrochromic device includes a substrate 102, a conductive layer (CL) 104, an electrochromic layer (EC) 106 (sometimes also referred to as a cathodically coloring layer or a cathodically tinting layer), an ion conducting layer or region (IC) 108, a counter electrode layer (CE) 110 (sometimes also referred to as an anodically coloring layer or anodically tinting layer), and a conductive layer (CL) 114. Elements 104, 106, 108, 110, and 114 are collectively referred to as an electrochromic stack 120. A voltage source 116 operable to apply an electric potential across the electrochromic stack 120 effects the transition of the electrochromic device from, e.g., a clear state to a tinted state. In other embodiments, the order of layers is reversed with respect to the substrate. That is, the layers are in the following order: substrate, conductive layer, counter electrode layer, ion conducting layer, electrochromic material layer, conductive layer.

In various embodiments, the ion conductor region 108 may form from a portion of the EC layer 106 and/or from a portion of the CE layer 110. In such embodiments, the electrochromic stack 120 may be deposited to include cathodically coloring electrochromic material (the EC layer) in direct physical contact with an anodically coloring counter electrode material (the CE layer). The ion conductor region 108 (sometimes referred to as an interfacial region, or as an ion conducting substantially electronically insulating layer or region) may then form where the EC layer 106 and the CE layer 110 meet, for example through heating and/or other processing steps. Electrochromic devices fabricated without depositing a distinct ion conductor material are further discussed in U.S. patent application Ser. No. 13/462,725, filed May 2, 2012, and titled "ELECTROCHROMIC DEVICES," which is herein incorporated by reference in its entirety.

In various embodiments, one or more of the layers shown in FIG. 1 may be deposited to include two or more sublayers. In one example, the EC layer 106 and/or the CE layer 110 may be deposited to include two or more sublayers. The sublayers within a given layer may have different compositions and/or morphologies. The sublayers may be included to promote formation of the ion conducting region 108 and/or to tune various properties of the electrochromic device 100.

Further, an electrochromic device may include one or more additional layers not shown in FIG. 1. Such layers may improve optical performance, durability, hermeticity, and the like. Examples of additional layers that may be used include, but are not limited to, anti-reflective layers, defect-mitigating insulating layers (which may be provided within or between any of the layers shown in FIG. 1), and/or capping layers. The techniques disclosed herein are applicable to a wide variety of electrochromic device designs.

In certain embodiments, the electrochromic device reversibly cycles between a clear state and a tinted state. In the clear state, a potential is applied to the electrochromic stack 120 such that available ions in the stack that can cause the electrochromic material 106 to be in the tinted state reside primarily in the counter electrode 110. When the potential on the electrochromic stack is reversed, the ions are transported across the ion conducting layer 108 to the electrochromic material 106 and cause the material to enter the tinted state.

It should be understood that the reference to a transition between a clear state and tinted state is non-limiting and suggests only one example, among many, of an electrochromic transition that may be implemented. Unless otherwise specified herein, whenever reference is made to a clear-tinted transition, the corresponding device or process encompasses other optical state transitions such as non-reflective-reflective, transparent-opaque, etc. Further the terms "clear" and "bleached" refer to an optically neutral state, e.g., untinted, transparent or translucent. Still further, unless specified otherwise herein, the "color" or "tint" of an electrochromic transition is not limited to any particular wavelength or range of wavelengths. As understood by those of skill in the art, the choice of appropriate electrochromic and counter electrode materials governs the relevant optical transition.

In certain embodiments, all of the materials making up electrochromic stack 120 are inorganic, solid (i.e., in the solid state), or both inorganic and solid. Because organic materials tend to degrade over time, inorganic materials offer the advantage of a reliable electrochromic stack that can function for extended periods of time. Materials in the solid state also offer the advantage of not having containment and leakage issues, as materials in the liquid state often do. Each of the layers in the electrochromic device is discussed in detail, below. It should be understood that any one or more of the layers in the stack may contain some amount of organic material, but in many implementations one or more of the layers contains little or no organic matter. The same can be said for liquids that may be present in one or more layers in small amounts. It should also be understood that solid state material may be deposited or otherwise formed by processes employing liquid components such as certain processes employing sol-gels or chemical vapor deposition.

The electrochromic device may receive power in a number of ways. Wiring and other connectors for powering electrochromic devices are further discussed in U.S. patent application Ser. No. 14/363,769, filed Jun. 6, 2014, and titled "CONNECTORS FOR SMART WINDOWS," which is herein incorporated by reference in its entirety.

The electrochromic device is typically controlled by a window controller, which may be positioned locally on or near the electrochromic device/window that it powers. Window controllers are further discussed in the following patents and patent applications, each of which is herein incorporated by reference in its entirety: U.S. patent application Ser. No. 13/049,756, filed Mar. 16, 2011, and titled "MULTIPURPOSE CONTROLLER FOR MULTISTATE WINDOWS"; U.S. Pat. No. 8,213,074; and P.C.T. Patent Application No. PCT/US15/29675, filed May 7, 2015, and titled "CONTROL METHOD FOR TINTABLE WINDOWS."

Communications Network

As described above, a network of electrochromic windows may be a power distribution network, a communication network, or both. Many of the embodiments herein focus on power distribution networks that may or may not also act as communication networks, and/or which may share certain components with a communication network. Where it is not specified how communication/control information is distributed, it is assumed that communication may occur through any available means. In some cases this may mean that communication occurs over the same wires, conduits, tie down anchors, and/or other components used by the power distribution network. In certain cases, communication may occur over some of the same wires/components as used by the power distribution network, with additional wiring provided for communication at particular places. In some cases, communication may occur wirelessly.

Figure 2:
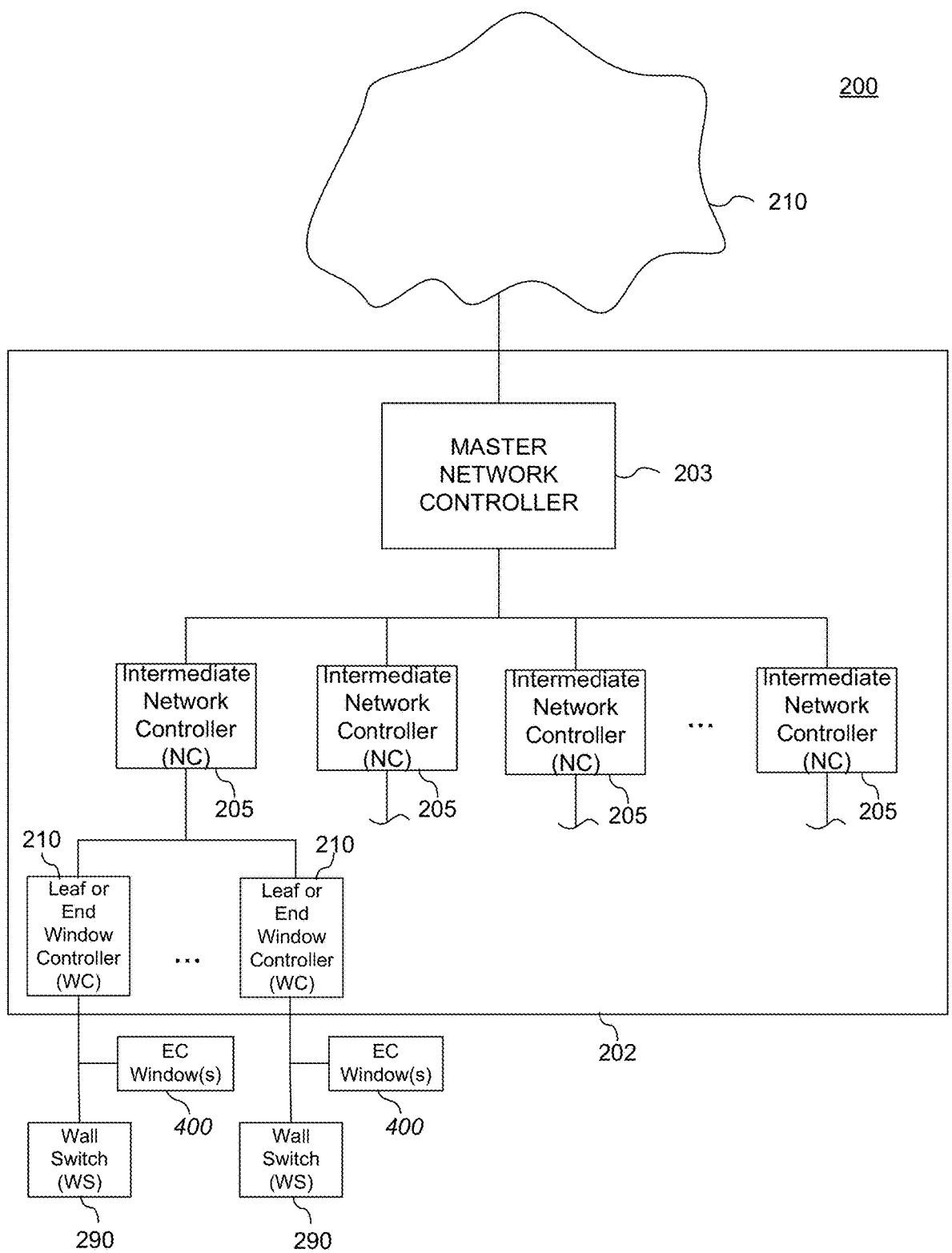
FIG. 2 presents a block diagram of components of a communications network for controlling functions of one or more tintable windows of a building.

FIG. 2 is a block diagram of components of a communications network system 200 for controlling functions (e.g., transitioning to different tint levels) of one or more tintable windows of a building, according to certain embodiments. As explained elsewhere herein, the communications network may be wholly or partially co-located with the power distribution network. System 200 may be one of the systems managed by a Building Management System (BMS) or may operate independently of a BMS.

System 200 includes a master window controller 202 that can send control signals to the tintable windows to control its functions. System 200 also includes network components 210 in electronic communication with master window controller 202. The predictive control logic, other control logic and instructions for controlling functions of the tintable window(s), and/or sensor data may be communicated to the master window controller 202 through the network 210. Network 210 can be a wired or wireless network. In one embodiment, network 210 is in communication with a BMS to allow the BMS to send instructions for controlling the tintable window(s) through network 210 to the tintable window(s) in a building.

System 200 also includes electrochromic windows 400 and wall switches 290, which are both in electronic communication with master window controller 202. In this illustrated example, master window controller 202 can send control signals to EC window(s) 400 to control the tint level of the tintable windows 400. Each wall switch 290 is also in communication with EC window(s) 400 and master window controller 202. An end user (e.g., occupant of a room having the tintable window) can use the wall switch 290 to control the tint level and other functions of the tintable electrochromic window (s) 400.

In FIG. 2, communications network 202 is depicted as a distributed network of window controllers including a master network controller 203, a plurality of intermediate network controllers 205 in communication with the master network controller 203, and multiple end or leaf window controllers 210. Each plurality of end or leaf window controllers 210 is in communication with a single intermediate network controller 205. Each of the window controllers in the distributed network of FIG. 2 may include a processor (e.g., microprocessor) and a computer readable medium in electrical communication with the processor.

In FIG. 2, each leaf or end window controller 210 is in communication with EC window(s) 400 to control the tint level of that window. In the case of an IGU, the leaf or end window controller 210 may be in communication with EC windows 400 on multiple lites of the IGU control the tint level of the IGU. In other embodiments, each leaf or end window controller 210 may be in communication with a plurality of tintable windows. The leaf or end window controller 210 may be integrated into the tintable window or may be separate from the tintable window that it controls.

Each wall switch 290 can be operated by an end user (e.g., occupant of the room) to control the tint level and other functions of the tintable window in communication with the wall switch 290. The end user can operate the wall switch 290 to communicate control signals to the EC window 400. In some cases, these signals from the wall switch 290 may override signals from master window controller 202. In other cases (e.g., high demand cases), control signals from the master window controller 202 may override the control signals from wall switch 290. Each wall switch 290 is also in communication with the leaf or end window controller 210 to send information about the control signals (e.g. time, date, tint level requested, etc.) sent from wall switch 290 back to master window controller 202. In some cases, wall switches 290 may be manually operated. In other cases, wall switches 290 may be wirelessly controlled by the end user using a remote device (e.g., cell phone, tablet, etc.) sending wireless communications with the control signals, for example, using infrared (IR), and/or radio frequency (RF) signals. In some cases, wall switches 290 may include a wireless protocol chip, such as Bluetooth, EnOcean, WiFi, Zigbee, and the like. Although wall switches 290 depicted in FIG. 2 are located on the wall(s), other embodiments of system 200 may have switches located elsewhere in the room.

Class 1 and Class 2 Power Circuits

The National Electrical Code (NEC) provides standards for the safe installation of electrical wiring and equipment in the United States. The NEC is published by the National Fire Protection Association (NFPA), which is a private trade association that has published a series of National Fire Codes. The NEC was drafted at least in part to provide uniform standards across the country, though it has not been adopted at a federal level. Many states and municipalities have adopted the NEC, or some version thereof. The NEC has also been approved as an American national standard by the American National Standards Institute (ANSI). The code is formally referred to as ANSI/NFPA 70. Adherence to NEC guidelines promotes safe installation and operation of electrical wiring and equipment.

The NEC classifies circuits into various categories (e.g., class 1, class 2, class 3). Such circuits are defined to include the portion of the wiring system between (a) the load side of an overcurrent protection device (OCPD) or the power-limited supply and (b) all equipment connected thereto. The circuits are classified based on their usage and electrical power and voltage limitations. Various sub-classes are also defined in the NEC, as discussed further below.

Generally speaking, class 1 circuits enable transmission of high voltages and high powers. Therefore, class 1 circuits may be used to power more windows from a single power source or power insert line (which may be a direct connection to a control panel or other power supply, for example a building power supply). As a consequence, class 1 power distribution networks typically require less overall cabling than comparable class 2 power distribution networks. Because of the high voltages and high powers involved with class 1 circuits, special precautions may be used to ensure safe operation. For example, under the NEC, cabling in a class 1 circuit should be either (1) class 1 rated cable, (2) run through conduit, and/or (3) run through an appropriate metal raceway.

The NEC divides class 1 circuits into two types: (a) power-limited circuits, and (b) remote-control and signaling circuits. Power-limited class 1 circuits are generally limited to 30 V and 1000 V·A, while class 1 remote-control and signaling circuits are limited to 600 V, with limitations on the power output of the source. Class 1 power-limited circuits include a current limiter on the power source that supplies the circuit. Therefore, in the event of a short circuit, overload, or ground-fault, the OCPD will act to restrict the amount of supply current on the circuit. The power source in a class 1 power-limited circuit may be a transformer or other type of power supply. Class 1 remote-control and signaling circuits must meet many of the same wiring requirements for power and light circuits. Class 1 remote control circuits are frequently used in motor controllers to operate mechanical processes, elevators, conveyers, and in other equipment controlled from a remote location. Class 1 signaling circuits are used in various contexts including hospitals (e.g., nurse call systems), electric clocks, bank alarms, and factory call systems.

With respect to class 2 circuits, the NEC imposes limits based on whether the circuit is inherently limited (requiring no overcurrent protection) or not inherently limited (requiring a combination of power source and overcurrent protection). In a number of cases, class 2 circuits may be limited to 30 V and 100 V·A. Wiring in a class 2 circuit is inherently safer than in a class 1 circuit, and fewer precautions are needed. For instance, cabling that is rated class 2 can be provided without the protections inherent to class 1 rated cabling, and does not need to be provided in a conduit or metal raceway.

Design of a power distribution network, and particularly whether such a network is designed as a class 1 or class 2 circuit, will depend on many factors including, but not limited to, the number of windows installed, the location of installed windows, the location of building power sources/control panels/other power sources, the layout of windows being installed, the existing infrastructure where windows are being installed, etc. Generally, class 1 circuits are beneficial for reducing the amount of cabling that must be installed. This may reduce the cost spent on cabling, since less overall distance of cable needs to be provided. This may also reduce the cost spent on installation, since less time and effort is spent pulling wires throughout a building. Class 2 circuits are beneficial for reducing other installation costs. For example, class 2 rated components (e.g., control panels/power supplies, cabling, etc.) may be less expensive than class 1 rated components. Similarly, class 2 circuits can be installed without running the cables through conduit or metal raceway, common in many class 1 circuits. Class 2 circuits may also be less expensive to install due to the fact that much or all of a class 2 power distribution network can be installed by less qualified personnel (as compared to class 1 power distribution networks where a licensed electrician may be needed). Based on these competing costs, as well as the factors listed above, either a class 1 or class 2 circuit may be used to implement the power distribution network for a particular application.

Power distribution networks configured as class 1 circuits may be more appropriate in large commercial buildings, buildings having a large number of optically switchable windows installed, and buildings in which the optically switchable windows are installed in a curtain wall rather than in individual punched openings. By contrast, power distribution networks configured as class 2 circuits may be more appropriate in smaller buildings with fewer optically switchable windows, residential buildings, and buildings lacking curtain wall installations. However, these guidelines are not intended to be limiting.

Power Distribution Network Physical Topology

Many topologies are possible for implementing a power distribution network to deliver power to a plurality of electrochromic windows. In various embodiments herein, a power distribution network can be characterized by at least two components: an upstream component and a downstream component. A single network can include multiple upstream components and/or multiple downstream components.

The upstream components include one or more primary power supplies (e.g., control panels) connected to the building's power supply and the components (e.g., cables) that are connected to the primary power supplies. The upstream components deliver power from the control panel or other power supply to the downstream components. The primary power supplies are essentially the most upstream components within the power distribution network. In many embodiments, the number of electrochromic windows is much higher than the number of cables used as upstream components. In other words, each upstream cable typically provides power to many electrochromic windows and window controllers. In some embodiments, an upstream cable provides power to at least 3 switchable windows, or at least 5 windows, or at least about 10 windows. This topology represents a substantial improvement over network topologies where separate cables provide power to each individual window controller from the primary power supply. In such cases, the number of power insert lines is equal to the number of window controllers. These configurations present serious challenges related to the huge number, length, and volume of cables that need to be accommodated to supply power to all of the window controllers/windows. For example, the primary power supplies in such topologies must be designed to accept a large numbers of cables, which can be challenging when many electrochromic windows are installed. Further, the labor involved in pulling such a large number/length/volume of cables throughout a building is extensive. For these reasons, power distribution networks that use fewer upstream cables to provide power to many electrochromic windows are advantageous.

Most of the downstream components receive power from the upstream components and deliver the power to the windows and window controllers. In many cases the downstream components include a bus line, a daisy chain, or similar physical topology with directly connected window controllers. In some cases the downstream components include drop lines, which deliver power (and in some cases communication information) directly to the window controllers. Typically, a drop line is an electrical connection between a bus line and an individual window controller. In addition to various power distribution cables (bus line, drop lines, daisy chain, etc.), the downstream components typically include electrical connectors. The electrical connectors may be power insert connectors, drop line connectors, or other types of connectors as described herein. Generally speaking, power insert connectors may be used to connect upstream power distribution cabling (e.g., power insert lines connected to a control panel) to downstream power distribution cabling (e.g., a bus line). Drop line connectors may be used to connect drop lines to a bus line. Such connectors are discussed further below. The window controllers may be connected in series in some cases. The downstream components can be characterized as including distinct segments in some embodiments, as discussed further with respect to FIG. 3C, below. The cabling used for the upstream components may be the same or different from the cabling used for the downstream components. In some embodiments, one or more remote power panels may be provided as downstream components. Remote power panels may receive power from a main building supply, and may provide power to a bus line via a remote power insert line. Typically, a remote power panel will deliver power to the bus line at a position that is more downstream than the position at which a primary power supply delivers power to the bus lines, as explained further below.

In certain implementations, at least a portion of the downstream and/or upstream cabling may be provided in a trunk line. Briefly, a trunk line is defined by a structural element and a positional element. Structurally, a trunk line is understood to include wires for carrying power. In many cases a trunk line also includes wires for carrying communication information, though this is not always the case. With respect to position, a trunk line is understood to be functionally positioned between the control panel and the individual drop lines (or the window controllers themselves if no drop lines are present). Drop lines can tap off of the trunk line to receive power and communication information. Drop lines are not considered to be part of the trunk line. In certain implementations, a trunk line may be a 5 wire cable (including one pair of wires for power, one pair of wires for communication, and one ground wire). Similarly, the drop lines may also be 5 wire cable. In some other implementations, the trunk line and/or drop lines may be 4 wire cable (including one pair of wires for power and one pair of wires for communication, without any separate ground wire). The trunk line may carry class 1 or class 2 power in various embodiments. Further details related to trunk lines and 5 wire cable are presented below.

In some particular embodiments, at least a portion of the downstream cabling (and optionally the upstream cabling) may be flat wire cabling, as discussed further below. Where flat wire cabling is used, the drop line connectors may be insulation displacement connectors, which are also discussed further below. Flat wire cabling enables wiring systems having more flexibility in tight spaces, as well as some benefits with cable handling and connectivity.

Figure 3A:
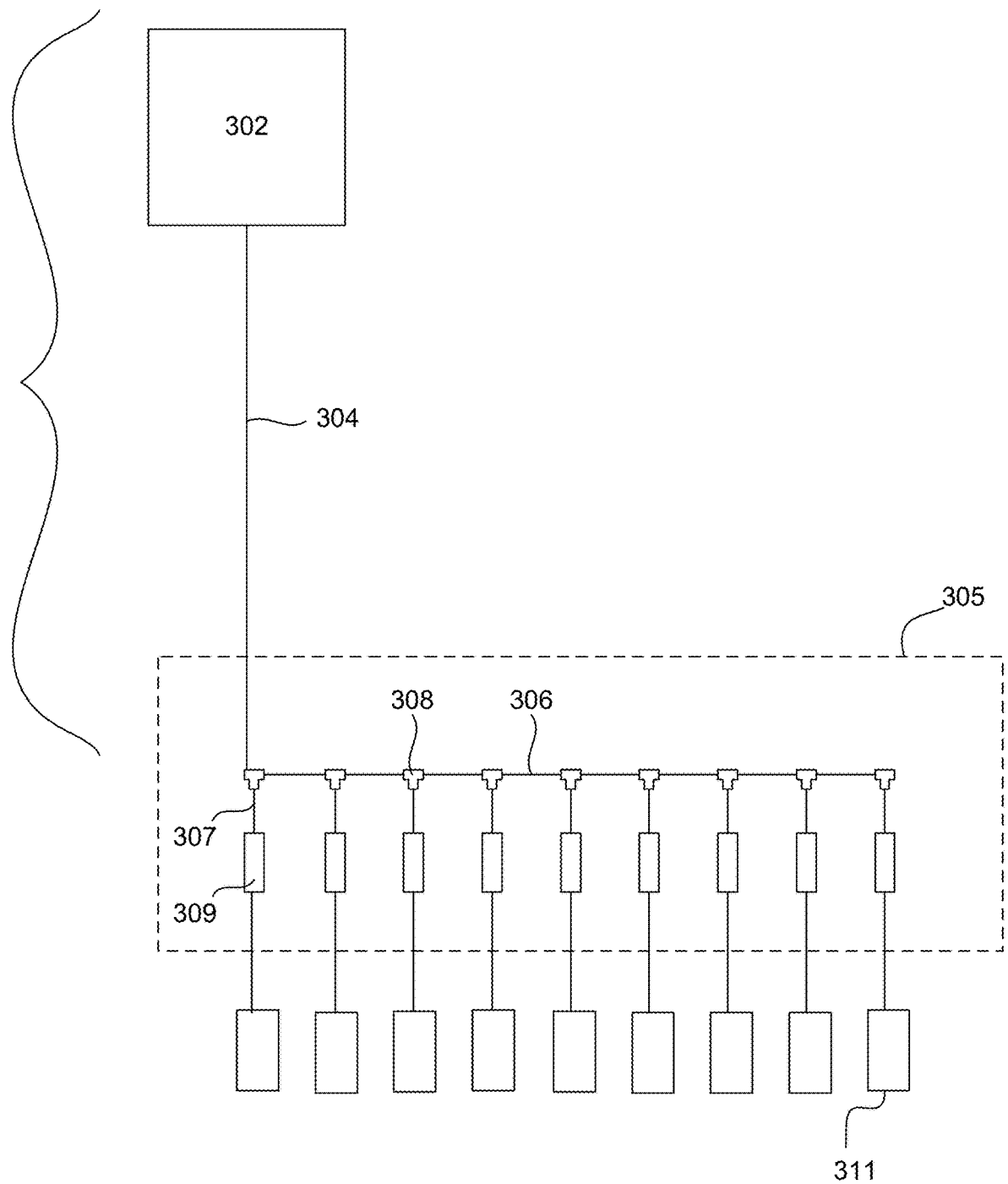
FIGS. 3A, 3B, and 3C illustrate upstream and downstream components in different embodiments of a power distribution network.

FIG. 3A presents a simplified view of a power distribution network for delivering power to a plurality of electrochromic windows. The upstream components 301 in FIG. 3A include the control panel 302 (which may receive power from a main building power supply), and a primary power insert line 304. The downstream components 305 in FIG. 3A include a trunk line 306, drop lines 307, and connectors 308 between the trunk line 306 and drop lines 307. The trunk line 306 may be a single continuous cable, or it may be several distinct cables that join one another at the connectors 308. In this example, the trunk line 306 is a linear bus, with drop lines 307 that connect each individual window controller 309 to the trunk line 306. Each window controller 309 controls one or more windows 311. Where the primary power insert line 304 is the same type of cable as used for the trunk line 306, it may be referred to as part of the trunk line 306. Often, the power distribution network includes multiple power insert lines (like line 304) and associated trunk lines, all connected to the same control panel. So, the topology depicted in FIG. 3A is often just one portion the power distribution network fed by a single control panel. Similar extensions are possible in the topologies depicted in FIGS. 3B and 3C.

Figure 3B:
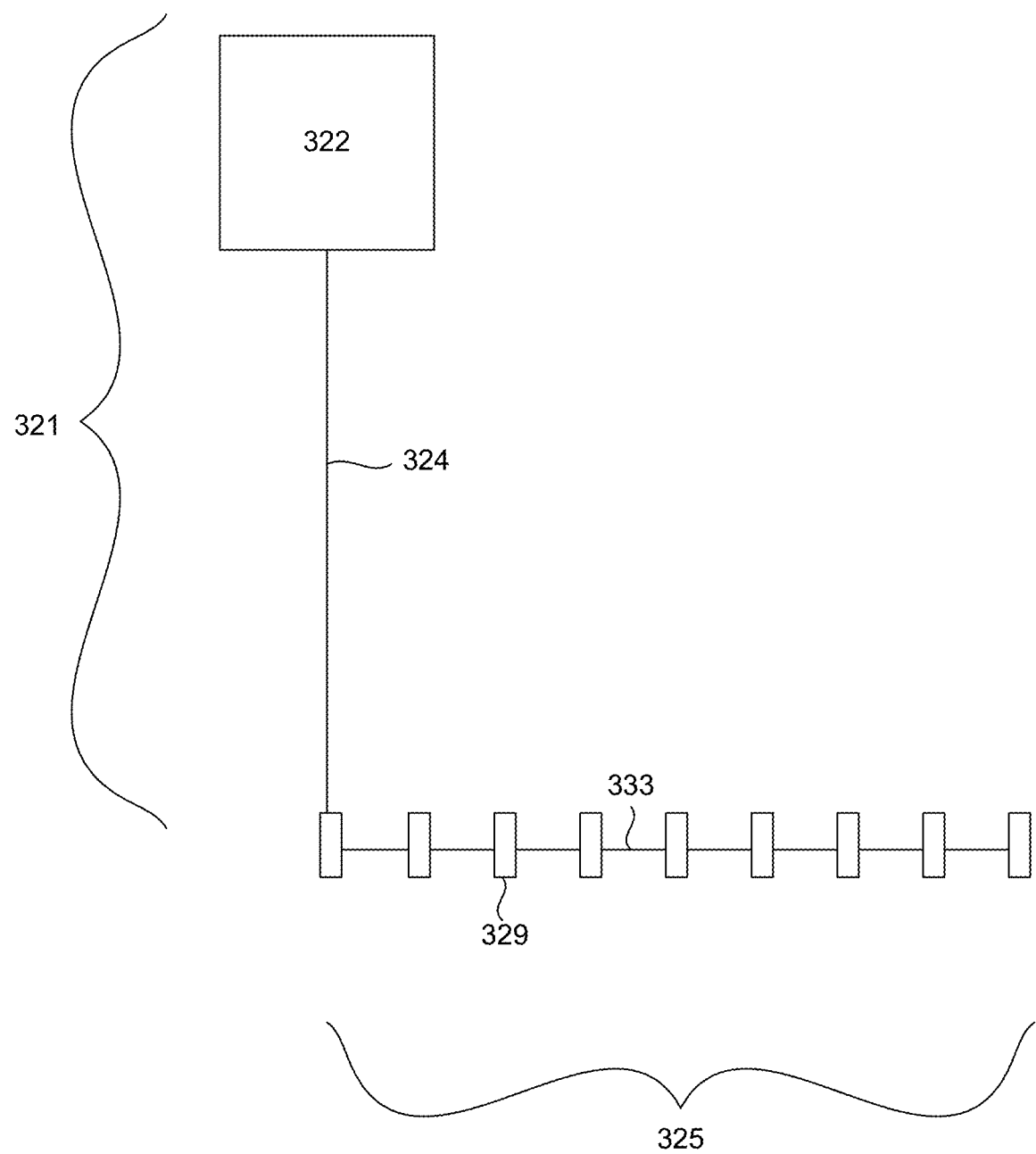

FIG. 3B presents a simplified view of another power distribution network. In this example, the window controllers are connected in series. This configuration is sometimes referred to as a daisy chain. Here, the upstream components 321 include the control panel 322 and the primary power insert line 324. The downstream components 325 include at least the intermediate cabling 333 that connects the window controllers and/or electrochromic windows with one another. For clarity, the windows are not shown. They are connected to the window controllers.

Figure 3C:
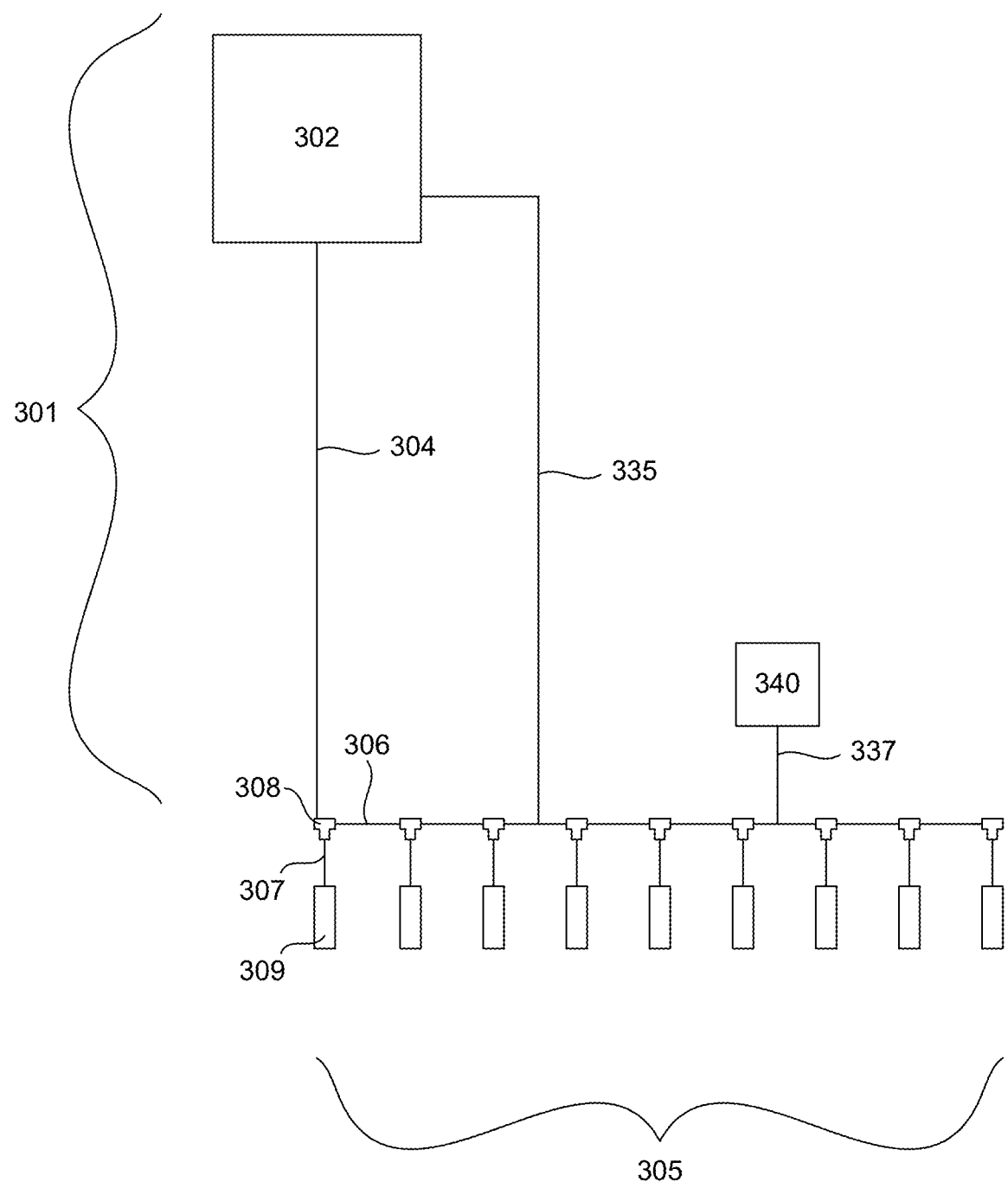

FIG. 3C illustrates an additional example of a power distribution network similar to the one shown in FIG. 3A. For the sake of brevity, only the differences will be discussed. In this example, the control panel 302 is connected to the trunk line 306 through two different upstream cables 304 and 335. The first upstream cable may be referred to as a primary power insert line 304 and the second upstream cable may be referred to as a secondary power insert line 335. The primary power insert line 304 connects with the most upstream position on the trunk line 306, whereas the secondary power insert line 335 connects with the trunk line 306 at a more downstream position on the trunk line 306. Each trunk line 306 has only a single primary power insert line 304, but can have one or more secondary power insert lines 335. The secondary power insert line 335 may be provided to ensure that sufficient power is delivered from the trunk line 306 to power all of the window controllers 309 and electrochromic windows (not shown) as needed. For example, limitations on current/voltage, as well as line losses, can limit the number of window controllers/windows that can be powered by an individual power insert line. To address this limitation, the control panel 302 may be connected with the trunk line 306 using a plurality of power insert lines. The maximum number of secondary power insert lines 335 connected to an individual control panel 302 may be limited by the available power output of the control panel 302. As with FIG. 3A, the primary power insert line 304 may be considered part of the trunk line 306 if they are the same type of cable. The secondary power insert line 335 and remote power insert line 337 (discussed further below) typically are not considered to be part of the trunk line 306.

The point at which a power insert line 304, 335, or 337 meets the trunk line 306 may be referred to as a power insert point. These power insert points can be understood to divide the downstream components 305 into multiple segments. In general terms, a segment refers to a group of window controllers connected contiguously to a section of the network (e.g., to a span of the trunk line between adjacent power insert points), and the associated section of the network. In FIG. 3C, three segments are shown, with a first segment being defined between the point at which the primary power insert line 304 meets the trunk line 306 and the point at which the secondary power insert line 335 meets the trunk line 306, the second segment being defined between the point at which the secondary power insert line 335 meets the trunk line 306 and the point at which the remote power insert line 337 meets the trunk line 306, and the third segment being defined between the point at which the remote power insert line 337 meets the trunk line 306 and the end of the trunk line 306. In this example, each segment of the downstream components 305 includes three connectors 308, three drop lines 307, three window controllers 309, and three electrochromic windows (not shown).

While FIG. 3C shows only three electrochromic window controllers per segment of the downstream components, the number of window controllers/windows between adjacent power insert points may be much higher. In some cases the number of window controllers and electrochromic windows positioned on each segment of the downstream components may be between about 10-20, or between about 20-30, or between about 30-40. In certain cases where the power distribution network is implemented as a class 1 circuit, up to about 32 window controllers/windows may be installed between adjacent power insert points. In certain cases where the power distribution network is implemented as a class 2 circuit, up to about 16 window controllers/windows may be installed between adjacent power insert points. The number of window controllers/windows that can be adequately powered on each segment depends on a number of factors including (i) the current or power drawn by each window controller, (ii) the current or power delivered by the upstream component cables (power insert lines), (iii) the length of the cables between adjacent window controllers and (iv) the number of windows that each controller can accommodate. For example, a window controller may control between one and about twenty windows, or up to about fifteen windows, or up to about ten windows, or up to about five windows.

With respect to the current or power drawn by each window controller, relatively more window controllers/windows can be accommodated on each segment of the downstream components when the window controllers/windows draw relatively less power. In certain examples, the window controllers each draw about 2 Watts or less. With respect to the current or power delivered by the upstream component cables/power insert lines, upstream cables that provide more current/power can be used to accommodate relatively more window controllers/windows per segment of the downstream components. For example, where the upstream components deliver class 1 rated power (as opposed to class 2 power), relatively more window controllers/windows can be positioned on each segment of the downstream components. With respect to the length of the cables between adjacent window controllers, longer lengths may result in higher line losses, thereby resulting in fewer window controllers/windows that can be accommodated on each segment.

Another difference between the power distribution network shown in FIG. 3C and the one shown in FIG. 3A is that the network in FIG. 3C includes a remote power panel 340. The remote power panel 340 provides power to the trunk line 306 through a remote power insert line 337. The remote power panel 340 may be connected to the main building power supply. Like the control panel 302, the remote power panel 340 may include circuitry or other protections to ensure that power is provided to the trunk line 306 at an appropriate voltage, current, etc. One difference between the remote power panel and the control panel in various cases is that the remote power panel acts merely as a source of power, whereas the control panel may have additional components that serve various communication and control functions for controlling optical transitions on the electrochromic windows. Compare, e.g., FIGS. 6E and 6G. Another difference is that the remote power panel 340 may be positioned at a location remote from the control panel 302. Often, the distance between the remote power panel 340 and the set of windows it powers is shorter than the distance between the control panel 302 and this same set of windows. This may help minimize the length of the remote power insert line 337, thereby minimizing line losses. Both the remote power panel 340 and the remote power insert line 337 may be considered to be part of the downstream components 301.

The primary power insert line 304, secondary power insert line 335, and remote power insert line 337 each provide power to the trunk line 306, and can collectively be referred to as the power insert lines. As mentioned, in certain cases a primary power insert line 304 may be considered to be part of the trunk line. The number of power insert lines used is largely affected by the number of electrochromic windows present on the power distribution network. Factors affecting the number of window controllers/windows that can be installed between adjacent power insert points are discussed further above.

Because the window controllers are provided proximate, e.g. next to, the optically switchable windows, in the downstream portion of the topology, relatively few cables need to originate from the control panel. Fewer than one cable per window emanate from the control panel. As a consequence, less labor and infrastructure is required for installation. For example, fewer J-hooks are required to support the weight of the cables between the control panel and the downstream portion of the topology.

Figure 4:
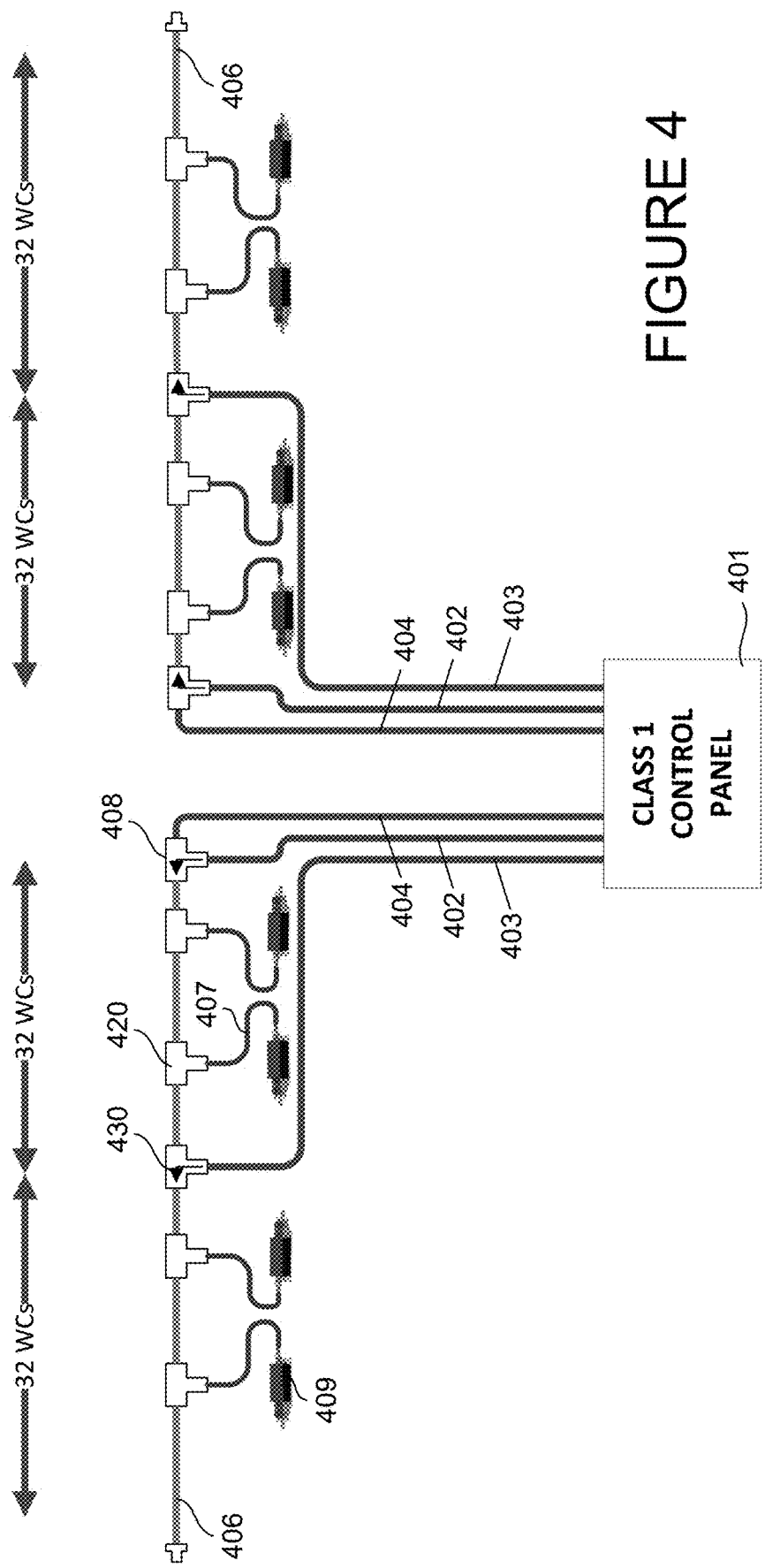
FIG. 4 depicts a schematic view of one embodiment of a class 1 power distribution network that also acts as a communications network.
Figure 5A:
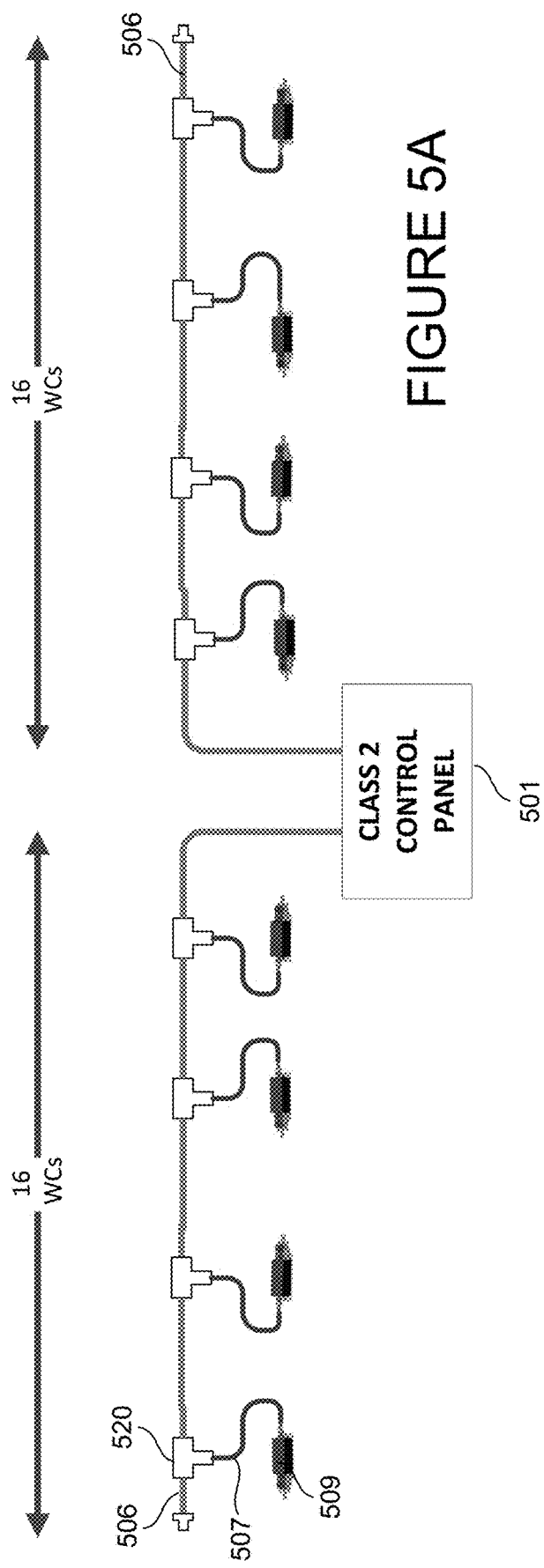
FIG. 5A depicts a schematic view of one embodiment of a class 2 power distribution network that may or may not also act as a communications network.
Figure 5B:
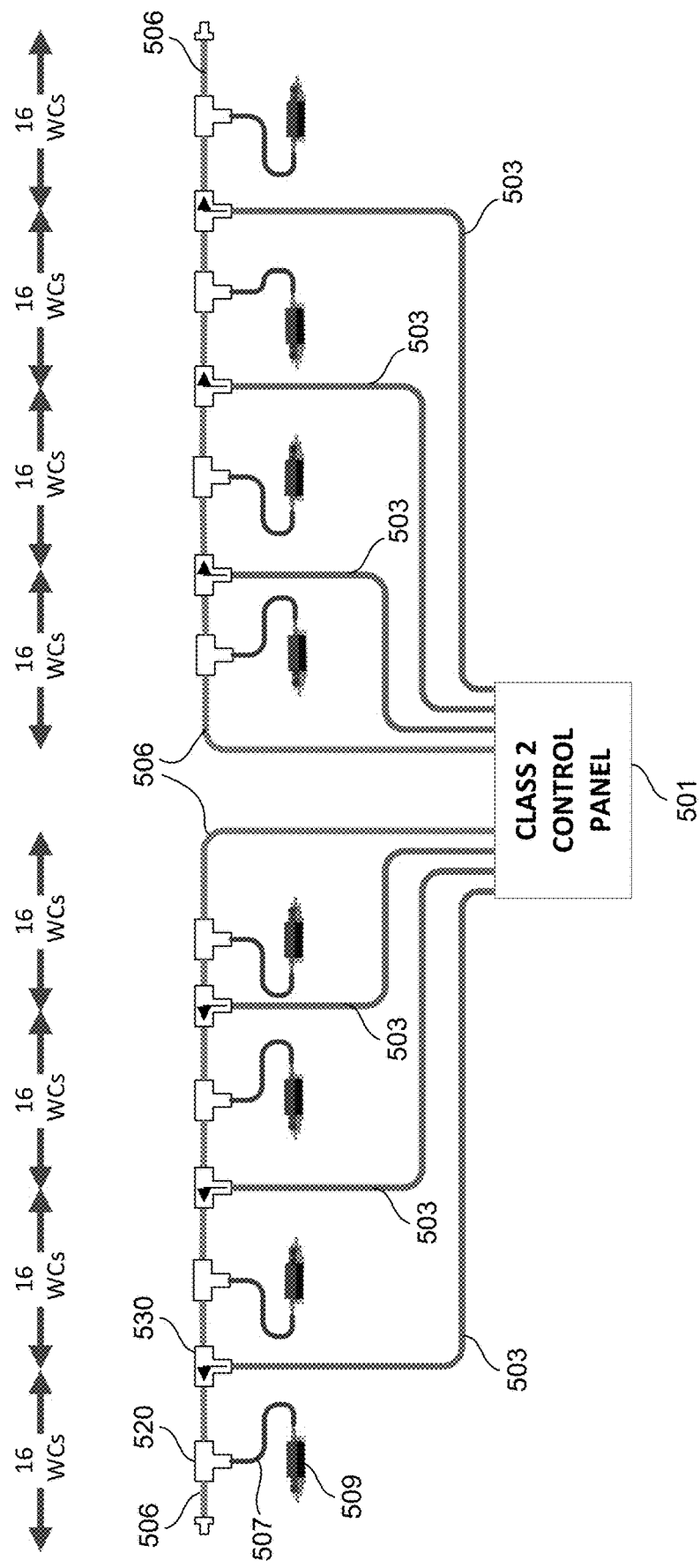
FIG. 5B depicts a schematic view of another embodiment of a class 2 power distribution network utilizing a number of secondary power insert lines.

While the embodiments of FIGS. 3A-3C show only a single control panel and a single trunk line, the embodiments are not so limited. In some related implementations, a single control panel may be connected with multiple trunk lines, for example as shown in FIGS. 4, 5A, and 5B, discussed further below. In some such cases the upstream cabling components may be run in parallel with one another for at least a portion of the distance between the control panel to the downstream components. In various embodiments, separate data communication lines may also traverse the distance from the control panel to the downstream components, though this is not essential. In these or other implementations, multiple control panels may be provided within a building, and each control panel may be connected with the primary building power. The control panels may be located together in a single location or dispersed throughout a building. Similarly, remote power panels can be provided throughout a building as desired. In some embodiments, a power distribution network may include a single control panel and any number of remote power panels.

FIG. 4 presents an example of a combined power distribution network and communications network. In this example the power distribution network is implemented as a class 1 circuit. A class 1 control panel 401 is connected to 6 individual cables 402-404. Cables 402 are primary power insert cables, cables 403 are secondary power insert cables, and cables 404 are communication cables. The primary power insert cables 402 and the communication cables 404 connect with trunk lines 406 at power/communication integration connectors 408. In this example the network includes two trunk lines 406, which are analogous to the trunk line 306 in FIG. 3A, for example. The trunk lines 406 may be rated at about 8 A or less. Drop lines 407 connect with the trunk lines 406 at drop line connectors 420, thereby providing power and control information to the individual window controllers 409. The secondary power insert cables 403 connect with the trunk lines 406 at power insert connectors 430. The primary and secondary power insert cables 402 and 403 carrying class 1 power may each be a particular length, for example up to about 200 feet or up to about 350 feet. Power insert cables longer than this length may result in substantial line losses in certain cases. For the sake of clarity, only a single drop line 407, window controller 409, power/communication integration connector 408, drop line connector 420, and power insert connector 430 are labeled in FIG. 4.

Though not shown in the figures, it is understood that each of the window controllers 409 is connected with at least one electrochromic window. Further, while FIG. 4 only shows two window controllers 409 per segment of the trunk lines 406 (the segments being defined between adjacent power insert points), many additional window controllers/windows may be provided in each segment. In certain implementations, for instance, the number of window controllers/windows per segment on a class 1 power distribution network may be at least about 10, at least about 20, or at least about 30. In various cases a class 1 power distribution network may have up to about 32 window controllers, each controlling one or more windows, on each segment of the trunk line, as suggested in FIG. 4.

Special considerations should be taken into account to ensure safe operation of the class 1 power distribution network. For instance, the various power insert lines, trunk lines, and/or drop lines carrying class 1 power may be provided in conduit or metal raceway, and/or they may be provided as class 1 rated cable. In some cases, different portions of the power distribution network satisfy the class 1 safety measures in different ways, for example one portion of the network may use class 1 rated cable while another portion of the network may use conduit or raceway to protect non-class 1 rated cable. In certain implementations, the power insert lines and/or trunk lines in a class 1 power distribution network may be rated at about 15 A and 600 V. In some cases, the power insert lines and/or trunk lines may be rated as TC-ER (tray cable-exposed run). A power limited tray cable (PLTC) may be used for the power insert lines and/or trunk lines in certain cases.

Power distribution networks implemented as class 1 circuits can be beneficial for various reasons. For instance, class 1 circuits can be used to minimize the overall length of wiring that should be installed to provide sufficient power to all of the windows on the network. Although power distribution networks implemented as class 1 circuits should meet the safety qualifications set out in the NEC (e.g., for cables carrying class 1 power, the use of class 1 rated cable, or the use of conduit or raceway to run non-class 1 rated cable), these qualifications may be particularly easy to meet in some embodiments. For example, where a set of electrochromic windows is provided in a curtain wall, with adjacent windows being separated by hollow mullions and/or transoms, such mullions/transoms can provide the raceway or conduit in which non-class 1 rated cable can be safely run. In other words, the curtain wall infrastructure itself can be used to provide the safety standards set out in the NEC, at least with respect to the cables that run within the curtain wall infrastructure. Mullions and transoms are often aluminum, though this is not required. Other materials and hollow structures used to frame adjacent windows may be used in this same way. With respect to cables that are not positioned within the curtain wall infrastructure (e.g., upstream cables such as power insert cables, portions of a trunk line not within the curtain wall, etc.), other class 1 protections such as conduit, raceway, or class 1 rated cable may be used.

In one example, the trunk line 406 may carry class 1 power without being rated as a class 1 cable. The trunk line 406 can safely carry class 1 power on non-class 1 rated cable by running the trunk line 406 through the metal mullions/transoms that form the curtain wall. In such embodiments, the power insert lines 402 and 403 may be rated as class 1 (in which case no additional safety measures are needed), or they may be rated as non-class 1 (in which case the power insert lines may be run through conduit or metal raceway to ensure safe operation). The existence of a curtain wall or similar structure where adjacent windows are separated by hollow structures makes the use of a class 1 power distribution network particularly beneficial, since non-class 1 rated cable can be easily and safely used to carry class 1 power. Class 1 rated cable is more expensive, larger, and therefore more challenging to install than similar non-class 1 rated cable.

It should be noted that where a dedicated communication line 404 is provided separate from the power insert lines 402 and 403 (such that the communication line 404 does not carry power), the communication line 404 does not need to be provided with particular safety measures. In other words, communication lines 404 do not need to be class 1 rated cable, nor do they need to be provided in conduit or metal raceway. Further, communication line 404 may be omitted in various implementations. In such cases, communication signals may be sent over the same cable as the primary power insert line 402 (e.g., a PLC-compliant implementation), or through another wired communications network (not shown), or wirelessly.

In another example where the electrochromic windows are installed in a set of punched openings (rather than together in a curtain wall), class 1 rated cable may be used for the power insert lines 402 and 403, and for the trunk lines 406. In another embodiment, any of the power insert lines 402 and 403 and the trunk lines 406 may be non-class 1 rated cable provided in an appropriate conduit or raceway. In a particular example, the trunk line 406 may be non-class 1 rated cable, but is provided in conduit or raceway between adjacent window controllers for windows installed in adjacent punched openings.

FIG. 5A presents an embodiment of a power distribution network that may also act as a communication network. Here, the power distribution network is implemented as a class 2 circuit. A class 2 control panel 501 is connected to two trunk lines 506. No separate communication lines are shown, and control information may either be carried over the trunk lines 506, over a separate communications network (not shown) or wirelessly. The window controllers 509 connect with the trunk lines 506 via drop lines 507. The drop lines 507 connect with the trunk lines 506 at drop line connectors 520. The trunk lines 506 may be class 2 rated cables. In some cases the trunk lines 506 may be rated at about 4 A or less. Due to the class 2 nature of the power distribution network in FIG. 5A, the number of window controllers that can be installed on each segment of the trunk line 506 is more limited than if the network were class 1. The number of window controllers/windows that may be included on each segment is discussed elsewhere herein. If the number of window controllers/windows exceeds the power that can be provided by the trunk lines 506 themselves, additional power insert lines may be provided, as shown in FIG. 5B. In this example, up to about 16 window controllers, each controlling one or more windows, may be installed on each trunk line.

FIG. 5B presents an additional embodiment of a power distribution network that may also act as a communication network. In this example, the network is implemented as a class 2 circuit. A class 2 control panel 501 is connected to 8 individual cables including two trunk lines 506 and six secondary power insert lines 503. Here, the trunk lines 506 extend all the way to the control panel 501, and no separate communication line or primary power insert line is provided. Communication information may be transferred over the trunk lines 506, or through wireless means, or through a separate communication network (not shown). As such, there is no need for a power/communication integration connector such as the connector 408 in FIG. 4. In a similar embodiment, separate primary power insert cables and communication cables may be provided to bring power and communication information to the trunk lines, as shown in FIG. 4. While no cables in FIG. 4 are described as primary power insert lines, it is understood that the trunk lines 506 perform this same function. Drop lines 507 connect the window controllers 509 to the trunk lines 506 at the drop line connectors 520. The secondary power insert lines 503 connect with the trunk lines 506 at power insert connectors 530.

Because the power distribution network in FIG. 4 is implemented as a class 2 circuit, fewer window controllers/windows can be powered by each segment of the network, as compared to a similar power distribution network implemented as a class 1 circuit. While FIG. 5B shows only a single window controller 509 on each segment (the segments being defined between adjacent power insert points, or between a power insert point and the end of the trunk line 506), many additional windows may be provided per segment in various cases. In some examples, a class 2 power distribution network may have at least about 10 or at least about 15 window controllers and associated electrochromic windows per segment. In certain implementations, up to about 16 window controllers (WCs), each controlling one or more associated optically switchable windows, may be installed per segment of the network, as suggested in FIG. 5B.

Although the number of windows per segment may be limited, the class 2 power distribution network may be advantageous for other reasons. For example, because the network is implemented as a class 2 circuit, none of the cabling needs to meet the safety requirements of a class 1 circuit. In other words, the cables can be non-class 1 rated cable, and can be run without the use of conduit or metal raceway. Such class 2 power distribution networks may be particularly useful in contexts where windows are installed in a punched opening construction (as compared to a curtain wall, for example). In a typical punched opening construction, individual windows (or small sets of windows in some cases) are installed in individual openings in the building's construction. Adjacent windows (or small sets of windows) are generally separated by concrete or other materials that make up the building itself. In other words, the building construction includes a large number of separate openings into which windows (or sets of windows) are installed. By contrast, with a curtain wall, many windows are installed together in a large opening in the building's construction. Adjacent windows are separated by a framing system of mullions and/or transoms, depending on the layout of the windows. While the mullions/transoms can be used to provide class 1 safety measures (e.g., the mullions/transoms providing the metal raceway in which non-class 1 rated wire can be run while safely carrying class 1 power, as described above in relation to FIG. 4) for implementing a class 1 power distribution network, no such convenient framing system is typically present between adjacent punched openings in a building. Therefore, in certain embodiments where a number of electrochromic windows are installed in several individual punched openings, it may be advantageous to implement the power distribution network as a class 2 circuit.

In some embodiments, the secondary power insert lines 503 and the trunk lines 506 may be rated at about 4 A or less. In some embodiments, power insert lines carrying class 2 power may be limited to a particular length, for example no more than about 350 feet.

Any of the power distribution networks described herein can further include one or more remote power panels and remote power insert lines, as shown in relation to FIG. 3C. Such features can be incorporated into both class 1 and class 2 power distribution networks.

Further, any of the power distribution networks described herein can further include one or more local power storage units, also referred to as energy wells, installed as a part of the downstream components within the network. For example, such energy wells may be installed on a trunk line or drop line, or they may be installed as a part of the window controllers. Energy wells may be used to increase the number of electrochromic windows that can be positioned on each segment of the downstream components. For example, a trunk line having 20 windows installed on a single segment may not be able to simultaneously power transitions on all 20 windows. While it is relatively rare for a network to transition all windows simultaneously, the network should be designed to handle such an event. When a command is received to transition all 20 windows, much of the power may be provided by a control panel and/or remote power panel. If the control panel/remote power panel can only provide enough power to drive transitions on 15 windows, the power needed to transition the remaining 5 windows may be provided by one or more energy wells. The energy wells can discharge to provide power as needed, and then can recharge via the power distribution network when the power demanded by the window controllers/windows decreases. Further details related to energy wells are provided below.

Components within Power Distribution Network

In this section, various components of the power distribution network are described in more detail.

1. Cabling

Many different types of cables may be used to implement a power distribution network. For different applications, the cable may be a class 1 rated cable or a non-class 1 rated cable (e.g., a class 2 rated cable), as discussed further above. In certain embodiments, the cables include insulation, e.g., insulation rated to about 150 volt or higher. Various gauge conductors may be used, e.g., AWG18 or AWG 22. Further examples and details follow.

A. Trunk Lines

Generally speaking, trunk lines are implemented as heavy duty power-carrying lines that can be tapped to provide power to individual window controllers. Trunk lines provide power to many individual window controllers. Trunk lines may also carry communication signals, though this is not necessarily the case. Trunk lines deliver power from an upstream component (e.g., a control panel or a power insert line) to the drop lines.

Figure 6A:
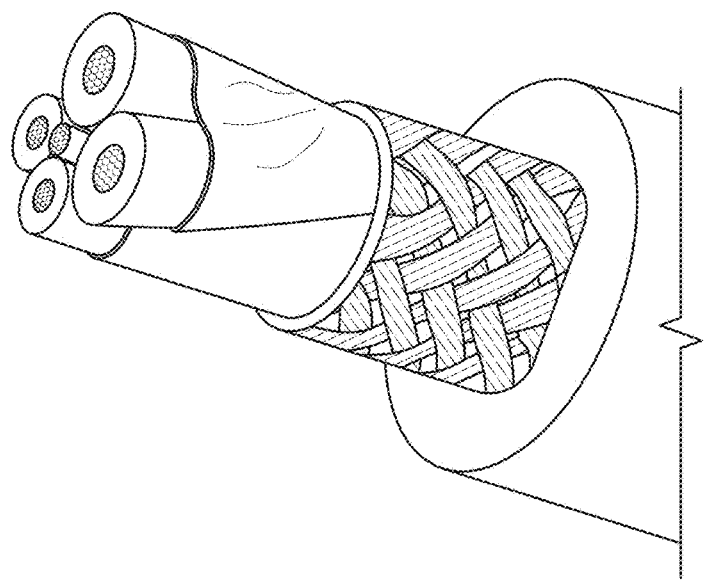
FIG. 6A depicts a 5 conductor trunk line according to one embodiment.

In some implementations, the trunk line may be a 5 wire cable that includes a twisted pair of power distribution lines, a twisted pair of communication lines, and a ground line. FIG. 6A presents a close up cross-sectional view of a 5 wire cable. Each of the power distribution lines and communication lines are insulated. The insulated power distribution lines are provided together in shielding/insulation, as are the two communication lines. All 5 lines are surrounded by a braided metallic shield, which is surrounded by an outer layer of insulation.

In one embodiment where a class 1 rated trunk line carries both power and communication signals, the diameter of the trunk line may be about ¾ inch, having about a ⅛ inch thick jacket insulation provided. In certain cases a class 1 rated trunk line may be rated as a tray cable exposed run (TC-ER) cable. Such cables can carry class 1 power without any need to provide conduit or raceway. Instead, this type of cable can hang in exposed runs. In one embodiment where a class 2 rated trunk line carries both power and communication signals, the diameter of the trunk line may be about ⅝ inch.

In some other implementations, the trunk line may be a 4 wire cable similar to the 5 wire cable described above, but lacking a ground wire. In some embodiments, the trunk line may be a flat cable having either 4 wires (two for power distribution, two for communication, one for ground) or 5 wires (two for power distribution, two for communication). Flat cable can be useful as trunk line when installing electrochromic windows because it can be very easily tapped to provide drop lines wherever they are needed without having to cut the trunk line. With a flat cable, the drop lines and power insert lines can be installed at any locations, not necessarily predetermined, on the trunk line. Further, flat cable permits expansion or reconfiguration of previously installed power distribution networks when new or additional optically switchable windows are deployed.

By contrast, it may be more difficult to install a network having a trunk line made from conventional (e.g., round) cable. The difficulty relates to the fact that conventional cables are typically cut wherever they join a connector (e.g., the drop line connectors and power insert connectors). The end of the cable is fed into the connector, which then provides a connection to other cables. With reference to FIG. 3A, where the trunk line 306 is implemented as a conventional round cable, each portion of the trunk line 306 between adjacent drop line connectors 308 may need to be a separate cable. As such, each of these cables should be cut to an appropriate length. It can be difficult to measure/guess what the appropriate length of cable will be for each particular span, which makes installation challenging.

Where a flat cable is used for the trunk line, drop lines can be added without cutting through the trunk line using, e.g., drop line insulation displacement connectors such as those described further below. The power insert lines can similarly be connected to a flat cable trunk line without cutting through the trunk line by using the power insert insulation displacement connectors described below. This is possible because flat cables have the internal wires separated and arranged in a fixed geometry and format. Therefore connectors can be configured to tap into one or more of the internal wires selectively. With reference to FIGS. 3A and 3C, the entire trunk line 306, as well as the primary power insert line 304, may be a single continuous cable (that has not been cut through). Of course, the drop lines and/or power insert lines can also be connected with the trunk line by severing the trunk line and using more traditional connectors. A flat cable allows e.g. drop cables to be configured anywhere along the continuous flat cable without the need to cut and splice into it; insulation displacement connectors allow tapping into the flat cable without cutting it.

Figure 6B:
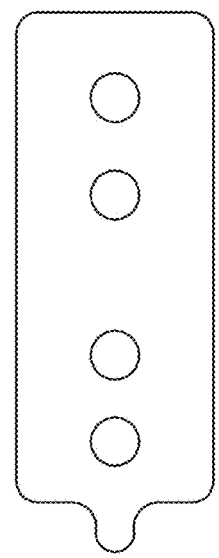
FIGS. 6B and 6C illustrate cross-sectional views of a 4 conductor flat cable trunk line according to certain embodiments.

FIG. 6B shows a cross-sectional view of a flat cable that includes 4 wires according to certain embodiments. The cable's cross section has a narrow dimension (oriented horizontally in FIG. 6B) and a long dimension (oriented vertically in FIG. 6B). The length of the cable extends into/out of the page. In one example, a flat cable trunk line has a cross-section that is about 1" by about 3⁄16". In many cases flat cable can be rolled up for storage/transportation.

Figure 6C:
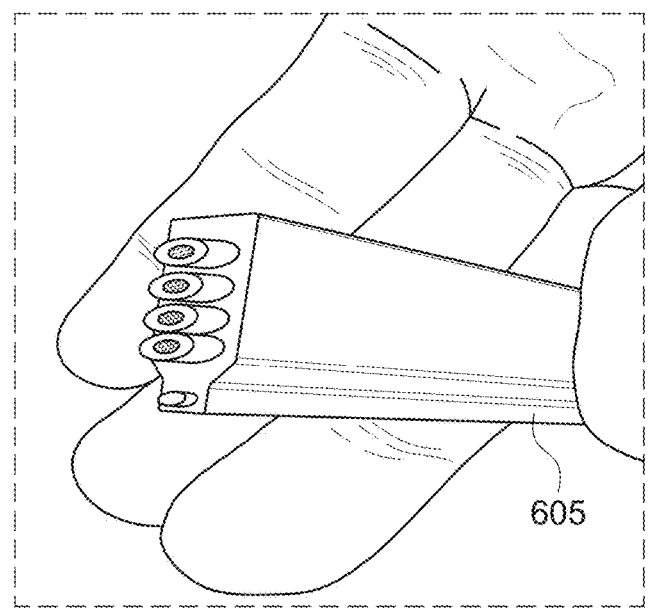

FIG. 6C is a picture illustrating the cross section of a flat cable as shown in FIG. 6B. The cross section of the flat cable is shown. The individual wires within the cable can be identified by their red (top), white (next to top), blue (next to bottom), and black (bottom) insulation, respectively. The flat cable has an asymmetric element, 605, in this example a neck or shoulder on one of the short sides (the bottom side as depicted). This asymmetric element allows the cable to be engaged with connectors the same way every time, thus the internal wires' configuration is fixed and wires can be selectively tapped using the appropriate insulation displacement connectors.

Other forms of trunk line cable can be installed in a network without requiring a break in the conductors to make a connection with another line (e.g., a drop line or a power insert line). One example is a "hybrid" cable having round sections and flat section. The connections are made at the flat sections, and the round sections provide greater flexibility than the flat sections. A hybrid cable may have many more flat sections than needed for connections. In another example, the trunk line cable is a conventional round cable or slightly modified round cable available for reconfiguring the conductors into a flat format during installation of a connector. In this way, the connector can be installed without breaking the conductors because the conductors have been reoriented from their round arrangement into a flat arrangement shortly before installing the connector. In some implementations, the reorientation is accomplished by stripping the jacket off a connecting location of round cable, followed by pressing the conductors into a flat arrangement, and then installing an insulation displacement connector. One or more tools may be used to facilitate the jacket stripping and conductor reorienting.

Figure 6D:
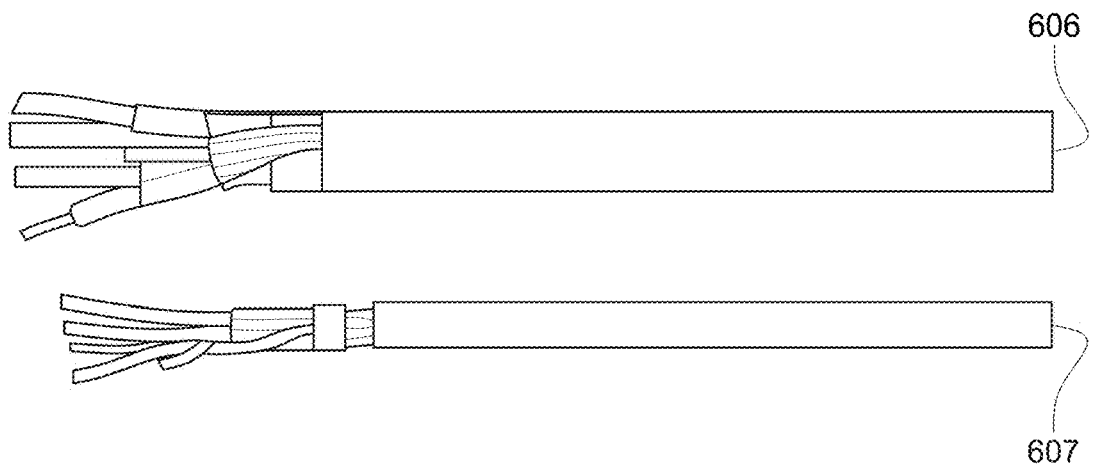
FIG. 6D depicts a trunk line and a drop line for comparison.

FIG. 6D illustrates one example of both a trunk line 606 and a drop line 607 for comparison. In this example, the cables are DeviceNet™ CPE cables. The trunk line has a wider diameter than the drop line.

B. Power Insert Lines

The power insert lines have, at a minimum, two wires for delivering power. A ground wire may also be provided. The conductors within each of the power distribution wires may be coated with insulation, and may be twisted together within an outer insulation. Power insert lines deliver power from an upstream component (e.g., a control panel or remote power panel) to a downstream component such as a trunk line. The power insert lines do not connect directly to the drop lines (except where a trunk line also acts as a power insert line).

As discussed with relation to FIG. 3C, the power insert lines can be classified into three main types: primary power insert lines 304, secondary power insert lines 335, and remote power insert lines 337. Primary power insert lines 304 deliver power from the control panel 302 to the most upstream portion of the trunk line 306. Typically, only a single primary power insert line is connected to each trunk line. Secondary power insert lines 335 deliver power from the control panel 302 to a location on the trunk line 306 that is more downstream than the location at which the primary power insert line 304 joins the trunk line 306. Multiple secondary power insert lines 335 may be provided on a single trunk line 306. Remote power insert lines 337 deliver power from a remote power panel 340 to a location on the trunk line 306 that is more downstream than the location at which the primary power insert line 304 joins the trunk line 306. The point at which the remote power insert line 337 joins the trunk line 306 may also be downstream of the point at which the secondary power insert line(s) 335 join the trunk line 306, as shown in FIG. 3C, or it may be upstream of this point. In cases where the trunk line extends all the way to the control panel, the portion of the trunk line that is upstream of any drop lines can be considered the primary power insert portion of the trunk line.

C. Drop Lines

The drop lines deliver power from a trunk line to a window controller. Typically, each window controller is connected to the trunk line via its own dedicated drop line. At a minimum, drop lines include two conductors for delivering power. A ground line may also be provided in the drop line. In many (but not all) cases, a drop line can have wires for delivering communication information from the trunk line to the window controllers. Where communication is transferred either through (a) a separate wired communication network (e.g., separate from the trunk line used for power distribution), or (b) wirelessly, there may be little or no benefit in including communication wires in the drop lines.

The drop lines connect with the trunk lines at drop line connectors. Such connectors are often tees, wyes, or specialized insulation displacement connectors as described below. Because the drop lines typically deliver power to only a single window controller, the drop lines can be thinner than the trunk line to which they connect.

FIG. 6D illustrates one example of a drop line 607, presenting it alongside a trunk line 606 to which it may be connected.

Class 1 cables must be rated at 600V. class are not allowed to carry a voltage marking. So they aren't confused with class 1. Most plenum cables, do have a label. But not intended to be characteristic of product.

2. Control Panels

A control panel may be provided to house various components relevant for powering (and in many cases controlling) electrochromic windows on a power distribution network. The control panel is typically the most upstream component of the power distribution network. The control panel receives power from a building power supply, which is often provided at, e.g., 120 V, 220 V, 230 V, 240 V, etc., depending on the country in which the network is installed. The control panel includes components for manipulating the power to convert it to a form that is more useful for powering the electrochromic windows/controllers. For example, the control panel may include a converter for converting the power from AC to DC. Further, the control panel may include a voltage converter for stepping down the voltage. The voltage converter may provide a voltage output that is on the order of about 10-30 V. In one example the voltage converter provides an output of about 24 V.

In a number of embodiments, a control panel typically includes a protection module that limits voltage and/or current output by the control panel. The limits dictated by the protection module may be based on guidelines set out in the NEC to ensure safe operation of a power distribution network implemented as a class 1 or class 2 circuit. The control panel may be a class 1 or class 2 component. Any of the guidelines set out herein or in the NEC with respect to class 1 and class 2 circuits/power supplies may apply to the control panels of the disclosed embodiments.

A control panel also includes one or more output ports. The output ports may be for power distribution, and in some cases may also serve to distribute communication/control information. The output ports can be connected to various lines in the power distribution network such as a trunk line, a primary or secondary power insert line, and a communication line.

Figure 6E:
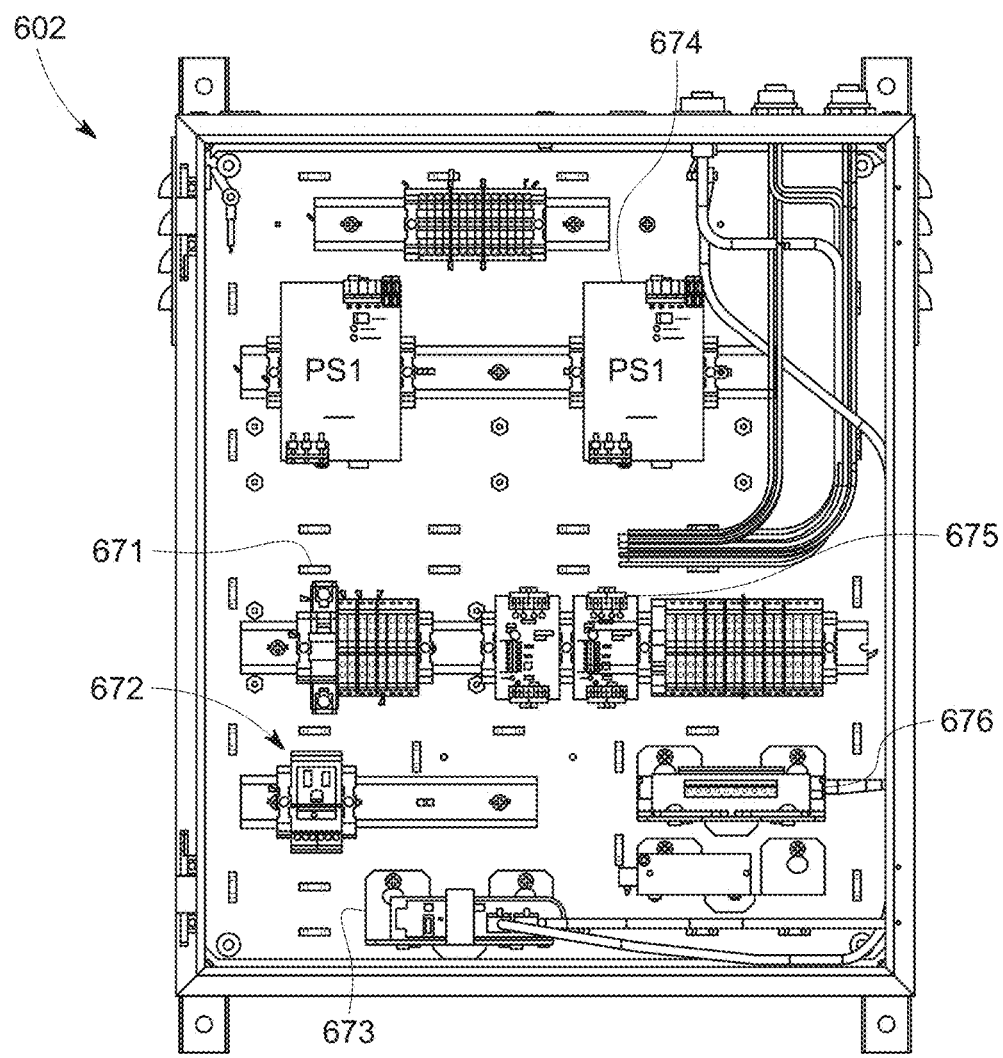
FIG. 6E illustrates the inside of a control panel according to certain implementations.

FIG. 6E presents a view of the inside of a class 2 control panel 602 for a power distribution network that also acts as a communications network. Among other components, the control panel 602 includes a circuit breaker 671, a power outlet 672, a DC power supply 674 (in this embodiment a 24 V DC power supply), a protection module 675, a network controller 676, and a master controller 673.

In certain embodiments of a power distribution network, some of these components may be omitted. For example, when using a class 2 power supply, a protection module may be omitted. Further, while the network controller 676 and master controller 673 are useful for distributing communication/control information, these controllers are not needed for implementing networks that distribute only power. Generally speaking, the network controller 676 coordinates and controls the optical transitions on a number of electrochromic windows, each window having its own window controller located outside the control panel. While only a single network controller 676 is shown in FIG. 6E, it is understood that a plurality of such network controllers 676 may be included. The network controllers 676 may in turn be controlled by the master controller 673. In some cases a control panel will include a network controller but no master controller.

In certain embodiments, the control panel is relatively small, e.g., having no dimension greater than about 40 inches or no dimension greater than about 26 inches. In one example, the control panel has dimensions of about 20-30 inches tall, about 15-25 inches wide, and about 5-10 inches deep.

Figure 6F:
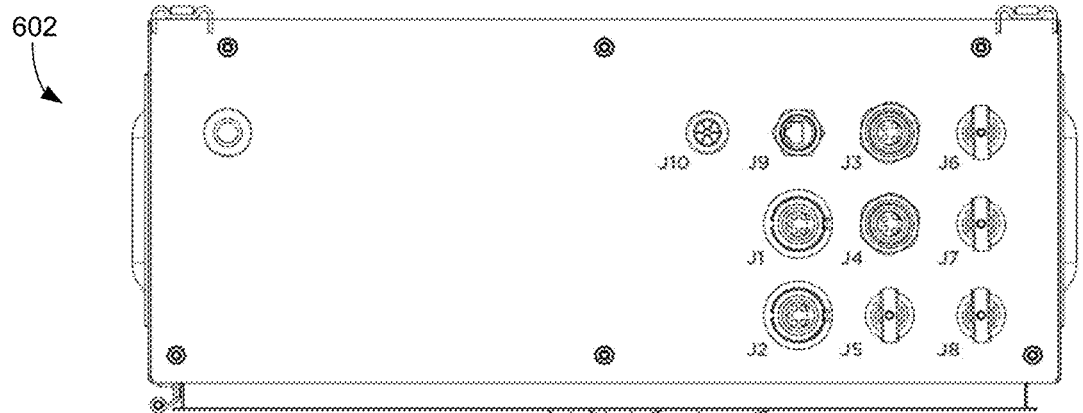
FIG. 6F depicts a top view of the control panel shown in FIG. 6E.

FIG. 6F presents a top view of the control panel 602 shown in FIG. 6E. In this figure, a number of output ports are shown. The control panel 602 in this example includes two output ports J1 and J2 for connecting to trunk lines, six output ports J3-J8 for connecting to power insert lines (primary or secondary), one output port J9 for connecting to an Ethernet LAN line, and a port J10 for an optical sensor/Ethernet cable. Those of ordinary skill in the art would understand that control panels can be fabricated to include various ports for attaching a number of trunk lines, power insert lines, communication lines, etc., as appropriate for a particular application. In certain examples, the control panel receives input power at between about 100-240 V (single-phase AC, 50/60 Hz), and outputs power at a nominal voltage of about 24 V (DC) and a nominal current of about 4.0 A (per connected power distribution line). The enclosure may be steel or another appropriate material. In one example, the control panel has an estimated BTU output of between about 400-600 BTU/hr, for example between about 450-550 BTU/hr.

In certain embodiments, a control panel includes a control panel monitor (CPM) configured to sense current and voltage on conductors in trunk lines and/or power insert lines directly connected to the control panel. Such sensing circuit allows monitoring, analysis, feedback, and/or correction of aspects of the power distribution network.

In certain embodiments, the CPM is configured to detect a voltage difference and/or a current difference on the input and output conductors of a power insert cable or a trunk line cable at the control panel. Any such difference may indicate a short circuit or other problem on one of the conductors. A voltage difference or current difference reading at the control panel may also indicate that there is a parasitic path to ground on one or both of the input and output lines and a cable.

In addition, measuring a voltage value on a cable conductor at the control panel allows comparison with voltage values measured at other locations on the circuit, which locations include individual window controllers served by the cable at various locations downstream of the control panel.

For each location downstream of the control panel on a cable, there is an expected difference from the voltage at the control panel due to transmission losses and power consumption at window controllers or other loads on the circuit. By measuring the voltage at the CPM (i.e., at the control panel), and at particular locations downstream of the control panel, the actual voltage differences can be can be compared to expected voltage differences. If the actual voltage differences deviate from the expected voltage differences by more than a small amount, within the margin of error of the measurements, control logic for the power distribution system may determine that a problem exists in the cable under consideration. For example, if the expected voltage difference is significantly greater or significantly less than expected at the time of installation, this may indicate that the length of the cable is not proper. For example, the installer may have used too long a cable (e.g., a power insert line) for a group of window controllers. Also, this unexpected voltage difference may result from installing a cable having the wrong gauge. In other example, if the actual measured voltage deviates significantly from the expected voltage, and this deviation is newly detected, long after installation, it may indicate a new problem such as a short-circuit or a parasitic path on a line of the cable.

In some cases, a problem will develop, and it is not immediately clear where on the power distribution network the problem resides. One way to resolve this is through determining the voltages at various points on a cable or circuit. For example, voltages may be measured at various window controllers on the circuit as well as at the control panel through the CPM. Cable segments having expected voltages or voltage differences are not the locus of the problem. However, a cable segment (or other portion of a circuit) presenting an unexpected voltage difference may include the locus of the problem. By considering voltage drops segment-by-segment, the CPM and associated logic can identify a discontinuity (e.g., an unexpected drop or jump in voltage) and associated the location of the discontinuity with the locus of the problem. In this manner, the system can isolate the problem on the power distribution network and initiate corrective action, e.g. sending more power into certain lines to make up for a line loss, bypassing a trunk line segment to avoid a shorting issue, initiating an alarm signal as to a problem in the power distribution system, and the like. In one embodiment, the CPM's logic automatically takes corrective action; this may be accompanied by a report being generated as to the problem, the actions taken and the current status of the system.

While voltage and current values are measured at the CPM board and at appropriate sense circuitry on window controllers or other components located downstream from the control panel, the logic for interpreting these voltage and current values may be located on a separate module such as a network controller and/or a master controller. As explained, network controllers, master controllers and other controllers reside on a communications network, sometimes referred to as a window network. In some embodiments, the CPM directly communicates sensed voltage and/or current values to the interpretation logic via the communications network and an appropriate communications interface, such as an Ethernet or CAN bus interface. The downstream components such as window controllers that report sensed voltages or currents may provide these values over a CAN bus or other appropriate network interface employed for communications among the window controllers. Voltage and current values reported by window controllers or other components to their local communications interface are ultimately directed to the logic that makes a determination of whether current and voltage values require action are flagging.

Figure 6G:
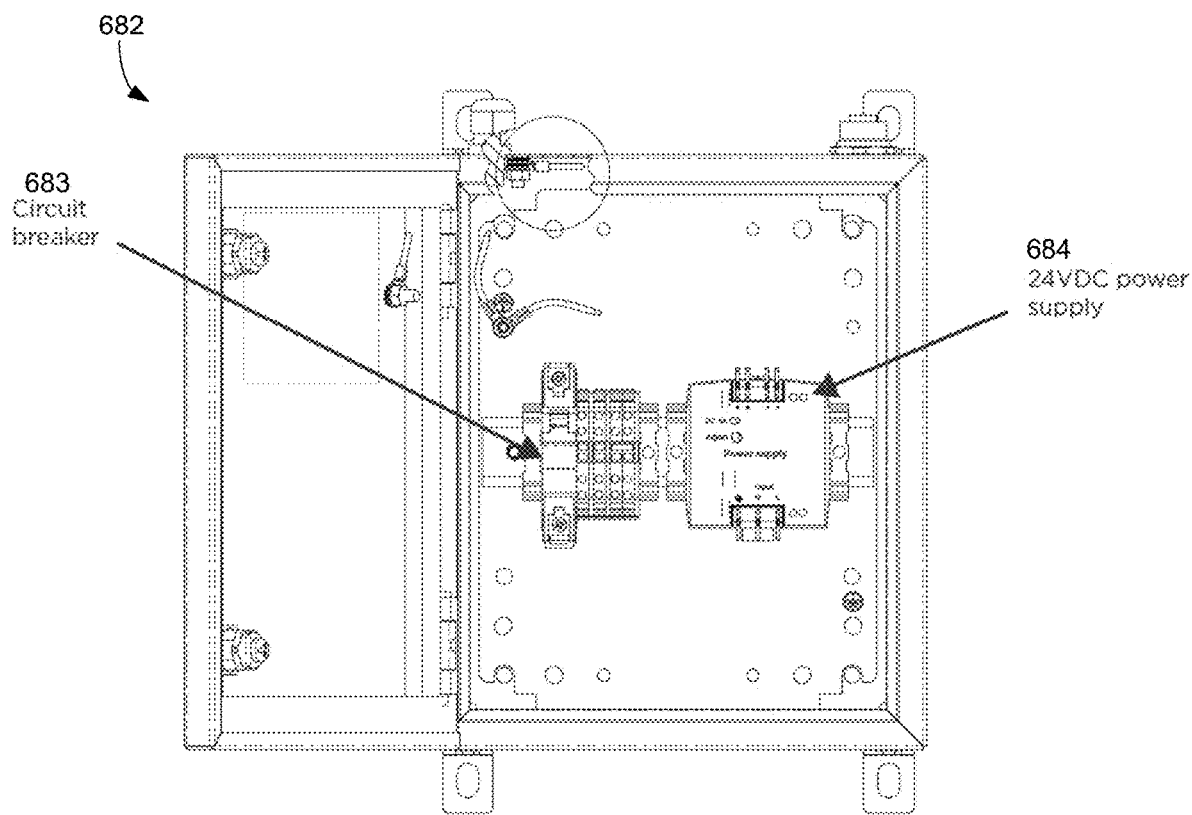
FIG. 6G illustrates the inside of a remote power panel according to certain embodiments.
Figure 6H:
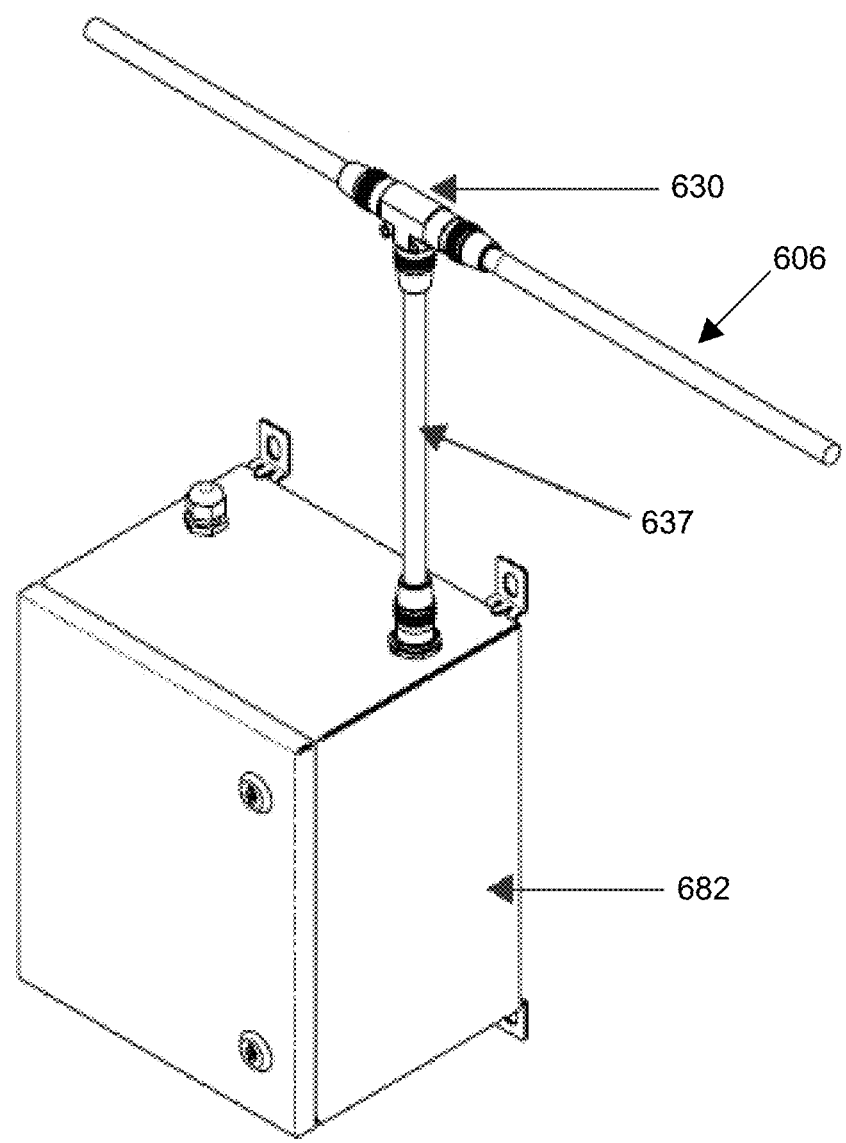
FIG. 6H depicts a remote power panel connected to a trunk line in accordance with certain embodiments.
Figure 6I:
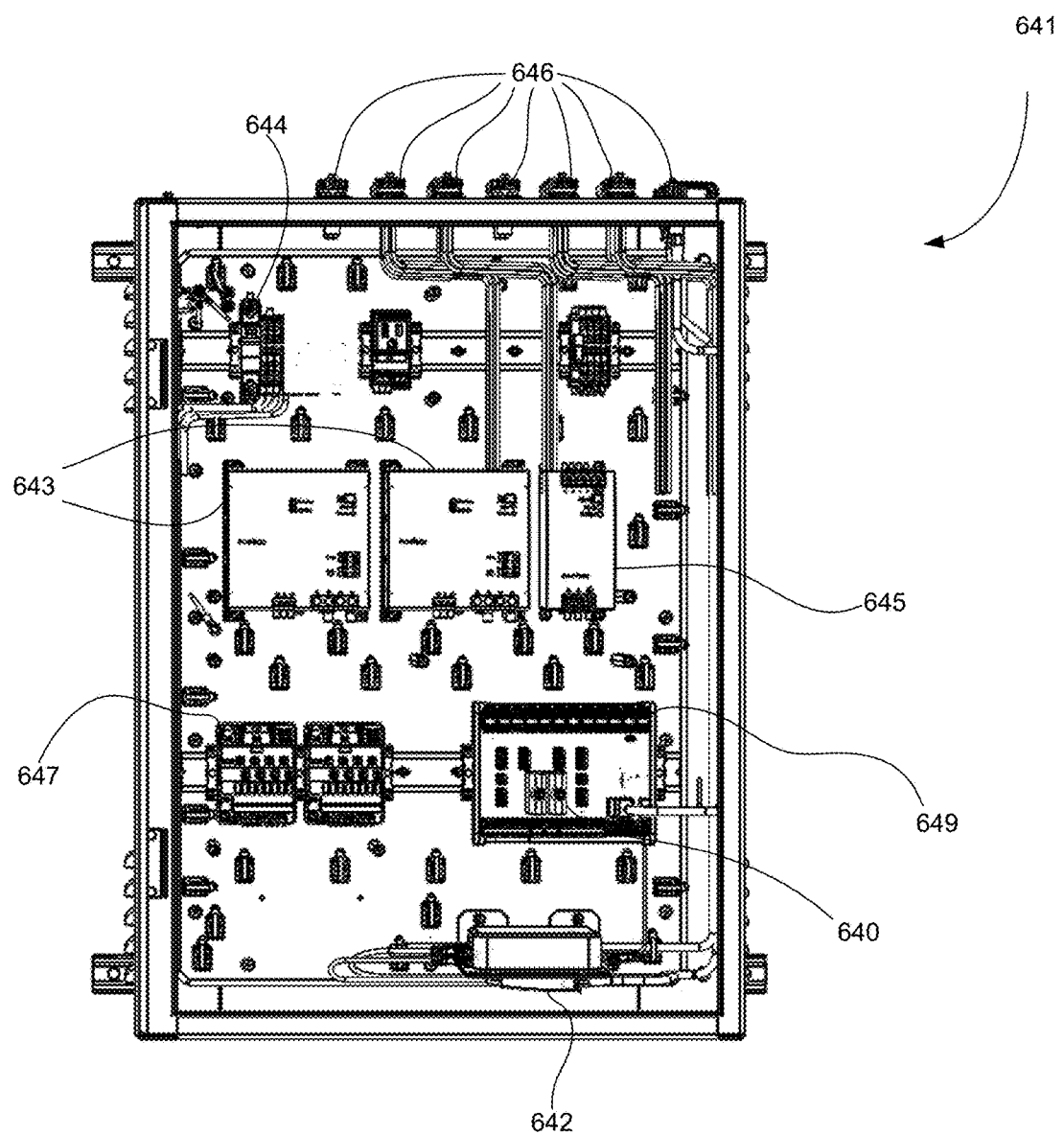
FIG. 6I illustrates an example of components contained in the control panel, including a control panel monitor.

FIG. 6I presents an example of components contained in the control panel that includes a CPM board. As shown in the figure, a control panel 641 includes one or more DC power supplies. In the particular embodiment depicted in FIG. 6I, the control panel 641 includes two high-power DC supplies 643 and a lower power DC supply 645. While these power supplies can deliver a wide range of power values, in one example, the high-power DC supplies 643 each provide 960

W at 24 V. Further, in an example, the lower power DC supply 645 provides 180 W of 12 V.

In the depicted example, power from these DC power supplies is provided to one or more protection modules 647. Two are shown in FIG. 6I. In certain examples, each protection module receives power on a single line and divides the power into multiple output lines. In some examples, the power on the output lines is of a particular class, such as class 2. In one example, the protection modules 647 in control panel 641 have eight output ports, each supplying class 2 power. In other words, each of the protection modules receives power via one input and provides power via eight outputs. As an example, each of the eight outputs may provide electrical power at 24 V and 4 A.

In the depicted embodiment, the power output from the protection modules 647 is provided to a control panel monitor (CPM) 649, as described above. The control panel monitor 649 includes sensing circuitry for determining the voltage and current on each of the input and output conductors of each of the output lines from protection modules 647. These are the same lines that ultimately provide power to the trunk lines and or power insert lines connected to control panel 641. It should be understood that the concept of providing a control panel monitor can be extended to any control panel architecture, which may include any number of power supplies, protection modules, ports for cable connections, etc.

One or more voltage values, current values, and/or other information about conductors monitored by the control panel monitor 649 is provided to appropriate analysis logic such as a controller 642. Controller 642 may be configured as a network controller, a master controller, both of these, or other appropriate logic component suitable for use with the window networks described herein. To provide communication between the control panel monitor 649 and controller 642, the control panel monitor 649 is outfitted with an appropriate communications interface such as a USB/CAN bus adapter 640.

Control panel 641 also includes multiple ports 646 on the exterior of the device for connecting to trunk lines and/or power insert lines as described herein. Additionally, control panel 641 is depicted with a circuit breaker 644.

The control panel 641 depicted in FIG. 6I can be deployed in any of the power distribution network topologies shown herein. For example, it may be used as class 1 control panel 401 in FIG. 4, as class 2 control panel 501 in FIGS. 5A and 5B, and the like. As explained, the control panel monitor 649 senses current and/or voltage on any one or more of the power insert or trunk lines that deliver power to the power distribution networks described herein. For example, monitor 649 may sense voltage on each of the conductors in each of lines 503 in FIG. 5B. It may also sense voltage on trunk line 506 (at a location where it connects to control panel 501) in FIG. 5B.

Figure 6J:
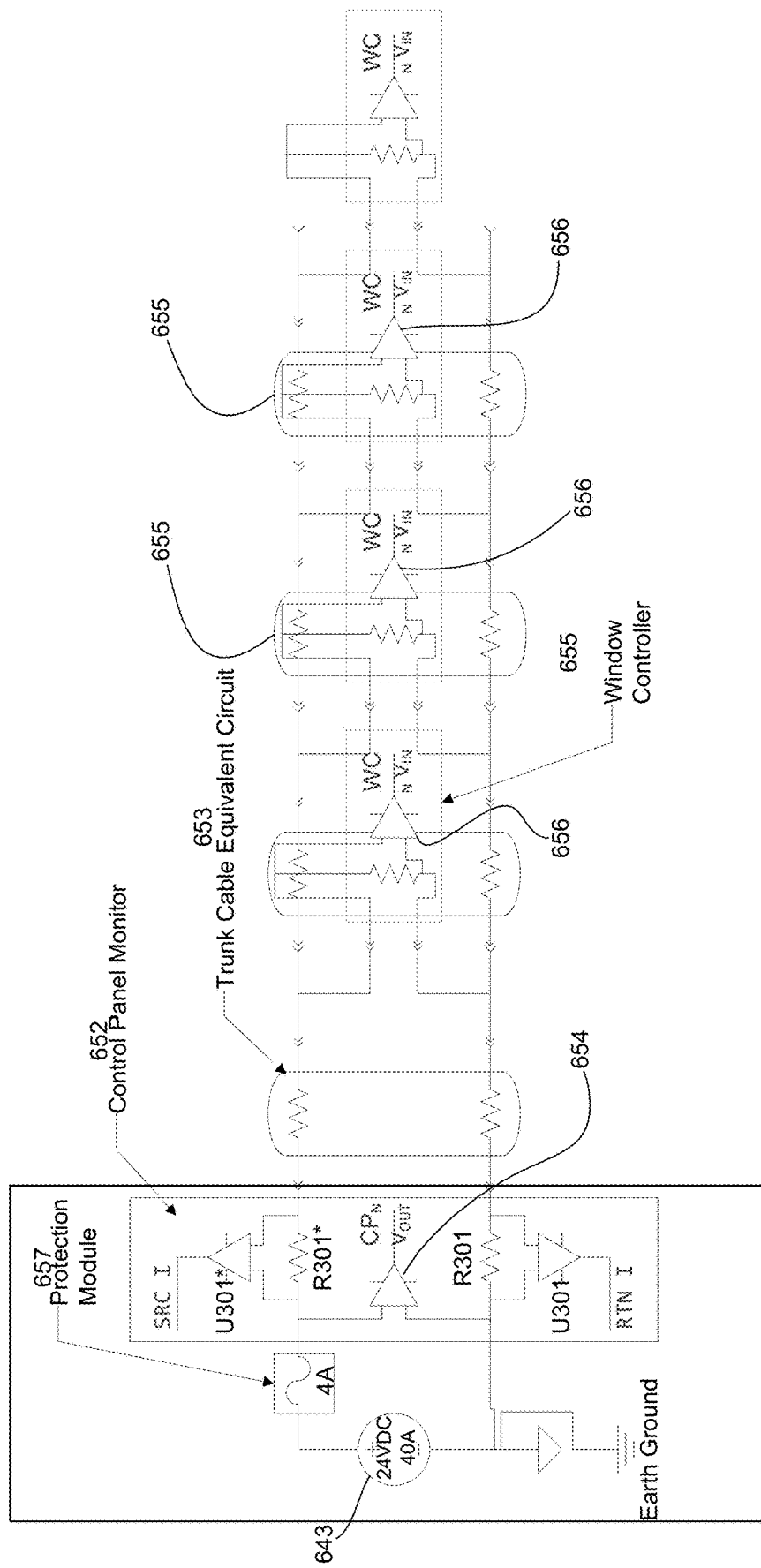
FIG. 6J illustrates an example of circuitry that may be deployed to implement a control panel monitor.

FIG. 6J presents an example of circuitry that may be deployed to implement a control panel monitor such as CPM 642. The figure depicts a control panel 651 and downstream locations on a trunk and/or power insert cable served by the control panel. The downstream locations include the conductor lines as equivalent circuits 653 and multiple window controllers 655.

In the depicted embodiment, each of window controller 655 is outfitted with an amplifier 656 for measuring the local voltage received at the respective window controllers. The voltage values may be reported back to the above-described logic that analyzes voltage or current values from the CPM.

In the depicted embodiment, the control panel 651 includes a power supply 649 (which may for example be one of the power supplies shown in the control panel FIG. 6I), a protection module 657 (which may be one or more of the protection modules shown in any of the figures depicting control panels), and a control panel monitor 652. As shown, the power supply 649 provides power to the circuit at a defined DC voltage and amperage, in this example 24 V and 40 A. Ultimately, the power is supplied to input and output conductors on the trunk line cable (or power insert cable), which connects to the various window controllers 656. The power supply 649 is also connected to ground. One conductor of the power supply is provided to a protection module 657 which steps down the amperage before delivering it on the trunk line cable or power insert cable. As explained above, a protection module may divide power from a power supply into multiple output lines.

In the depicted embodiment, control panel monitor 652 lies on the cable side of the power supply and protection module. The control panel monitor 652 is configured to monitor the voltage on each of the conductors supplying power on a given cable as well as of all the difference between these two conductors at the location of the control panel monitor. To this end, a differential amplifier 654 is configured to sense the voltage difference between the two conductors. Additionally, on each conductor, there is a small highly precise resistor labeled R301. In one example, it has a nominal resistance of 0.010 ohm+/−100 ppm. Used in conjunction with amplifiers U301, the resistors R301 allow the control panel monitor to obtain the magnitude of the voltage on each of the conductors of a given cable.

FIG. 6K presents an additional embodiment of a power distribution network where the components contained in the control panel include a CPM board. As in FIG. 5B, the power distribution network includes a control panel 501', in this case shown with a control panel monitor 660. In this example, 8 individual cables including two trunk lines 506 and six secondary power insert lines 503 are connected to the control panel 501' and the control panel monitor 660. Note that the trunk line 506 extends all the way to the control panel monitor 660. The trunk line optionally carries one or more conductors dedicated to communications transmission; it additionally carries the conductors transmitting power. The control panel monitor 660 is configured to sense current and voltage on conductors in (or directly attached to) these trunk lines 506 and power insert lines 503 at the control panel 501'. As explained, such sensing circuit allows monitoring, analysis, feedback, and/or correction of aspects of the power distribution network. Communication information may be transferred over the trunk lines 506, or through wireless means, or through a separate communication network (not shown).

3. Remote Power Panels

A power distribution network may include one or more remote power panels. The remote power panels are typically connected to a building's main power supply, which may be provided at, e.g., 120 V, 220 V, 230 V, 240 V, etc., depending on the country in which the network is installed. Like the control panels, the remote power panels can include components that convert the building power to a form that is more useful for powering electrochromic windows and window controllers. For instance, an AC/DC power converter may be included. Further, the remote power panels (like the control panels) may include components that limit the current and/or voltage output by the panels.

A remote power panel can output class 1 or class 2 power, depending on how the power distribution network is configured. If the network is not configured to safely handle class 1 power, then the remote power panel should be limited such that it does not deliver class 1 power. In one example, a remote power panel does not include any class 1 circuits and is a class 2 component. Any of the features/characteristics set out herein with respect to class 1 or class 2 circuits/power supplies may apply to the remote power panels.

As compared to a control panel, a remote power panel may be different in a few respects. First, a control panel is connected to a trunk line at the most upstream portion of the trunk line (and optionally at more downstream locations, as well, through secondary power insert lines). By contrast, a remote power panel is typically connected to a trunk line at a downstream position. In this way, the control panel may provide power to window controllers and windows on more upstream portions of the trunk line and the remote power panel may provide power to window controllers and windows that are positioned at locations on the trunk line that are more downstream. In some cases, however, a remote power insert line may connect with a trunk line at a location that is more upstream than a location where a secondary power insert line joins the trunk line. Another difference is that a control panel frequently includes components used for distributing control information for the window controllers. Such components may include a master controller and network controllers, as discussed above. These communication-related components may be omitted in the remote power panels. Due to these differences, the remote power panel may be smaller, geometrically speaking, than a control panel on the same power distribution network.

Remote power panels may be positioned at a location that is far from the control panel. In various cases, the distance between a remote power panel and the point at which it joins a trunk line is shorter than the distance between the control panel and this same point. In many cases this means that the remote power panel is closer (compared to the control panel) to the electrochromic windows being powered by the remote power panel.

FIG. 6G depicts the inside of a remote power panel 682. The components labeled in this figure include the circuit breaker 683 and the DC power supply 684. In this example a 24 V DC power supply 684 is provided. In certain cases, the remote power panel receives input power at between about 100-240 V (single-phase AC, 50/60 Hz), and outputs power at a nominal voltage of about 24 V and a nominal current of about 4.0 A (per connected power distribution line). The material of the enclosure may be steel or another material as appropriate.

FIG. 6H shows a view of a remote power panel 682 connected to a remote power insert line 637, which connects to a trunk line 606 via a power insert connector 630.

4. Connectors

Figure 7A:
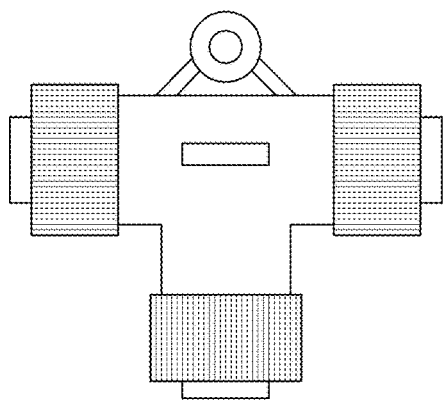
FIG. 7A shows a tee-shaped connector that may be used for various connectors described herein.
Figure 7B:
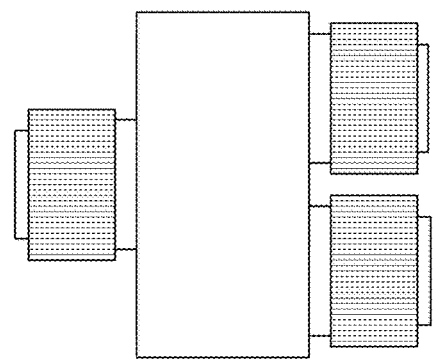
FIG. 7B shows a wye-shaped connector that may be used for various connectors described herein.

Various types of connectors have been described in connection with the disclosed power distribution networks. Generally speaking, the connectors can be categorized into three different types: drop line connectors, power insert connectors, and power/communication integration connectors. In various cases one or more of these connectors may be implemented using tees (as shown in FIG. 7A), wyes (as shown in FIG. 7B), and/or insulation displacement connectors (as shown in FIGS. 7C-7F). The connectors may be used to implement a power distribution network using a linear bus topology, daisy chain, etc.

A. Drop Line Connectors

Drop line connectors can be used to connect a drop line to a trunk line. At a minimum, drop line connectors are configured to connect to power conductors in the trunk line and distribute power to a connected drop line. In some cases, the drop line connectors may be tees or wyes, as shown in FIGS. 7A and 7B, respectively. In some other cases, the drop line connectors may be insulation displacement connectors, as described in relation to FIG. 7C.

FIG. 7A illustrates a tee-shaped connector that may be used as a drop line connector in some embodiments. The connector includes three main portions: a left portion, a right portion, and a lower portion (as shown in FIG. 7A). Each of these portions can be connected to by an appropriate cable. The left and right portions each extend out horizontally, and the lower portion extends downward, perpendicular to the left and right portions. In one example, a trunk line connects to the left and right portions, and a drop line connects to the lower portion. If desired, the connector can also be configured such that the drop line connects to the left or right portion, and the trunk line connects with the remaining portions. The connector includes male and/or female ends, as appropriate for a particular implementation.

FIG. 7B illustrates a wye-shaped connector that may be used as a drop line connector in some embodiments. Here, the connector includes three portions that can be connected to: a left portion, an upper right portion, and an upper left portion. Each of these portions extends out horizontally. In other words, the portions extend outwards in a parallel manner such that each of the lines connected to the connector can extend parallel to the other lines connected to the connector. In one example, a drop line is connected to the upper or lower right portion, and the trunk line is connected to the remaining portions. Each of the portions includes male/female ends, as appropriate for a particular application. Tees and wyes are shaped differently but perform the same function. Wyes may be particularly advantageous to use when the space for connecting a drop line is limited. One example embodiment where this may be the case is where the drop line runs through a window framing system (e.g., transoms and/or mullions of a curtain wall in some cases) or another relatively narrow hollow space. Because all of the cables can connect to a wye in a parallel configuration (geometrically speaking), this type of hardware results in an installation that is less bulky when installed in a narrow space.

In some embodiments, the different portions of a wye connector may extend out at an angle, rather than having each of the portions be perfectly parallel. For instance, with reference to FIG. 7B, the upper right portion may extend up/right, and the lower right portion may extend down/right. While the different portions of the wye do not extend out in parallel directions in this embodiment, the wye would still save space compared to a tee, which includes one portion that extends in a direction perpendicular to the other portions.

In certain cases where the trunk line is implemented as a flat cable (e.g., as shown in FIGS. 6B and 6C), the drop line connectors may be drop line insulation displacement connectors, as shown in FIGS. 7C-7F. Insulation displacement connectors are designed to connect to the conductors within an insulated cable by piercing a sharp blade or blades through the insulation on the flat cable. An electrical connection can therefore be established without stripping the conductors of insulation before making the connection. The conductor blade may cold-weld to the conductor in the flat cable trunk line, which results in a reliable, environmental connection. Insulation displacement connectors are particularly easy and quick to install onto a flat cable trunk line, often requiring no more than a screwdriver. The connector can be installed in, for example, 1 to 2 minutes. Further, insulation displacement connectors can be placed anywhere along a trunk line, thereby eliminating or reducing the need to have multiple cables of pre-determined length. This should be compared with making connections in conventional round cable, which may require cutting the cable and its conductors and then twisting the cut ends to make the new connection. This process can be particularly challenging in difficult to access locations such as ceilings.

In various examples, an insulation displacement connector includes at least the components to pierce the insulation on the trunk line and establish an electrical connection that can be used to distribute power to the drop line. In a number of cases the insulation displacement connector is also configured to establish a connection that can be used to distribute communication information from the trunk line to the drop line. In some cases the drop line insulation displacement connector includes 4 pins (two for distributing power and two for distributing communication information) or 5 pins (those listed with respect to the 4 pin example and an additional pin for ground). The drop line may be connected to the insulation displacement connector either directly or through a connector on the drop line itself that interfaces with the insulation displacement connector on the trunk line. In one example, the insulation displacement connector may be provided with a drop line already attached.

Figure 7C:
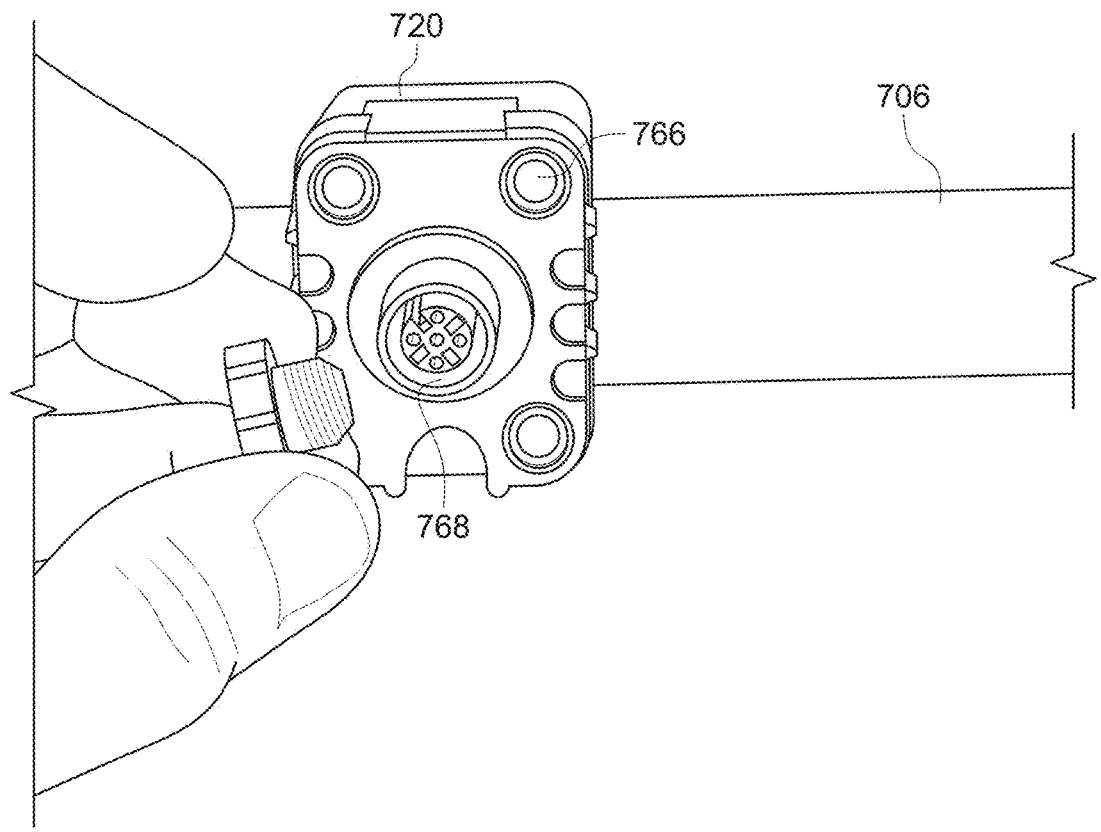
FIGS. 7C and 7D show a drop line insulation displacement connector attached to a flat cable trunk line.

FIG. 7C presents an example of a flat cable trunk line 706 with a drop line insulation displacement connector 720 installed. The drop line insulation displacement connector 720 includes a front portion and a back portion that sandwich together over the flat cable trunk line 706. Screws 766 hold the front and back portions together. The drop line insulation displacement connector 720 includes a port 768 having female or male connectors for connecting the drop line, as appropriate for a given application.

Figure 7D:
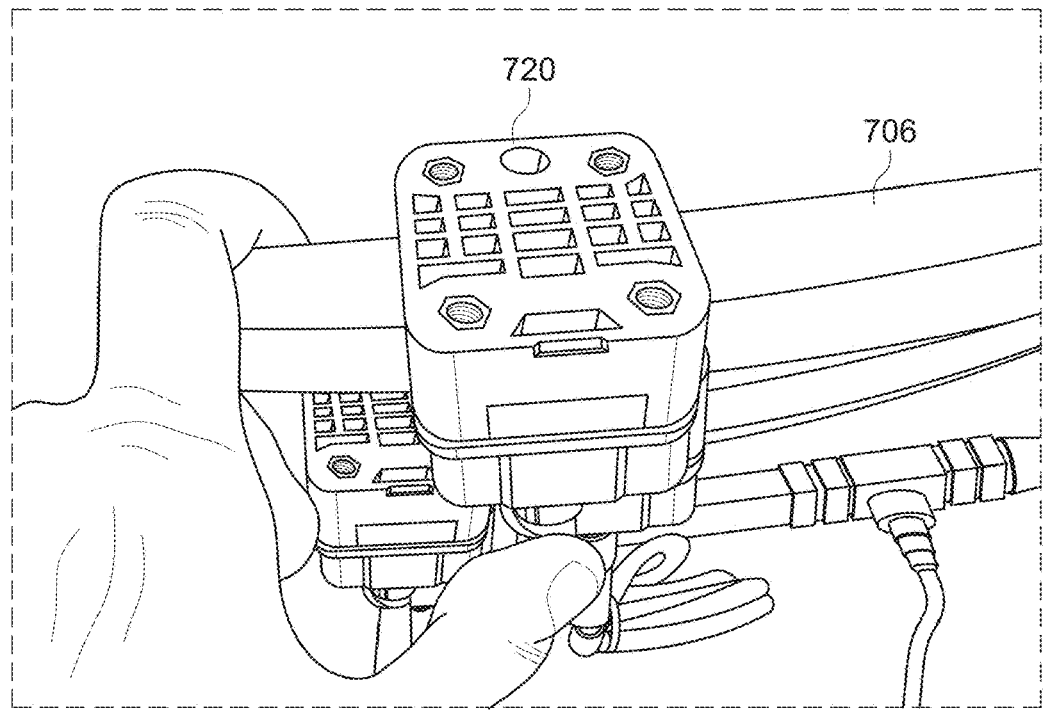

FIG. 7D shows the back side of the back portion of the drop line insulation displacement connector 720 and trunk line 706 shown in FIG. 7C.

Figure 7E:
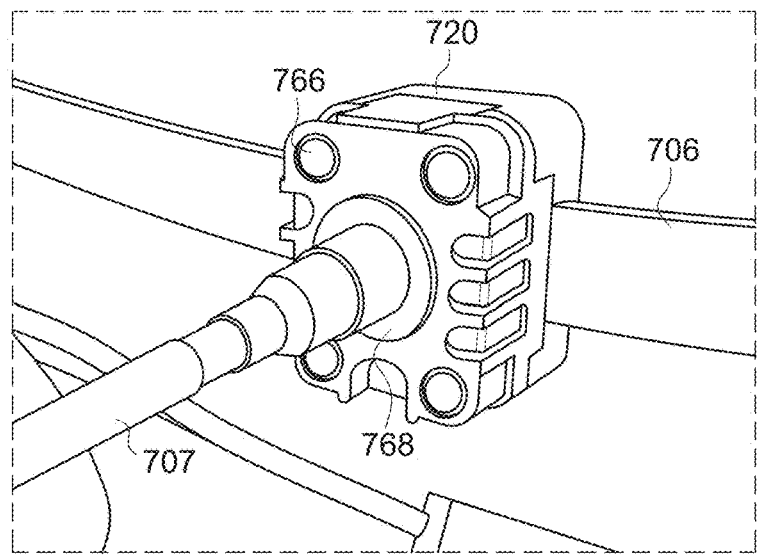
FIG. 7E shows a drop line connected to a trunk line via a drop line insulation displacement connector.

FIG. 7E shows the trunk line 706 and drop line insulation displacement connector 720 shown in FIGS. 7C and 7D. Here, a drop line 707 is shown connected to the drop line insulation displacement connector 720 via the port 768.

Figure 7F:
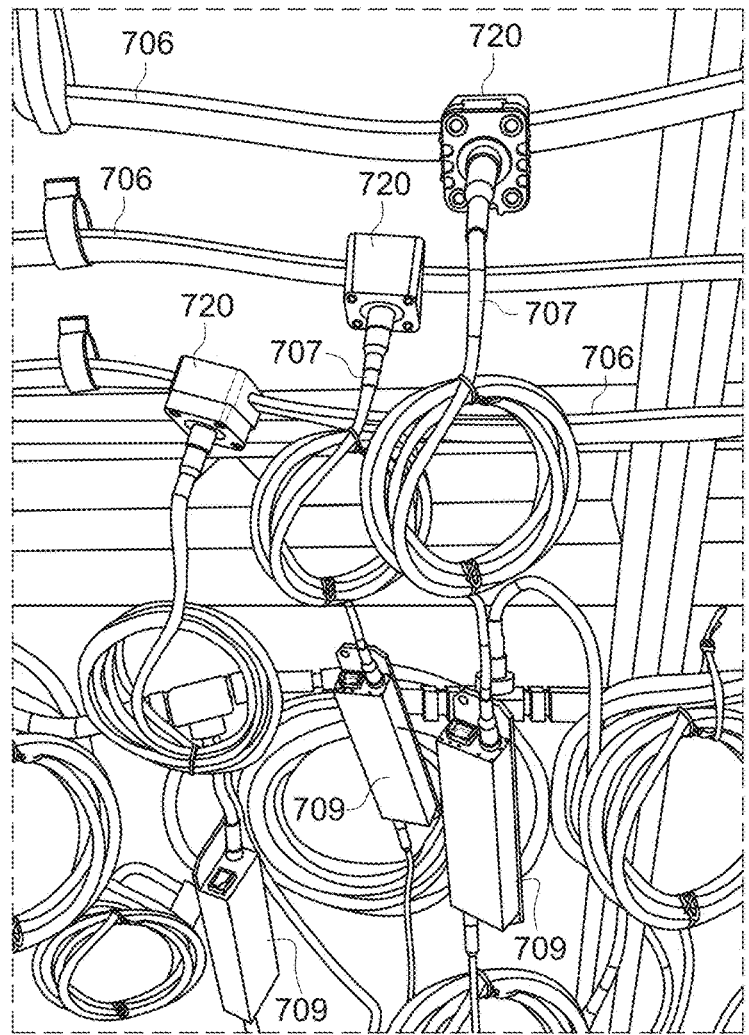
FIG. 7F shows several window controllers connected with trunk lines via several drop lines and drop line insulation displacement connectors.

FIG. 7F illustrates three separate trunk lines 706, each having a drop line insulation displacement connector 720 and drop line 707 connected thereto. Connected to each of the drop lines 707 is a window controller 709. The three trunk lines 706 may be connected with one or more control panels (not shown). Such connections may be made directly or indirectly (e.g., through one or more power insert lines). In a particular example, both the flat cable trunk lines 706 and the drop lines 707 carry both power and communication information. In another example, the lines may be configured to distribute power but not communication information.

B. Power Insert Connectors

Power insert connectors provide an electrical connection between a power insert line and a trunk line. The power insert line may be a primary power insert line, a secondary power insert line, or a remote power insert line. Similar to the drop line connectors, a variety of different designs can be used to implement the power insert connectors. In some cases, a power insert connector may be a tee or a wye, as illustrated with respect to the connectors shown in FIGS. 7A and 7B. Though these figures are described above in relation to drop line connectors, the power insert connectors may also take these same shapes. Both of the connectors shown in FIGS. 7A and 7B include three portions. In the case of a drop line connector, one of these portions is configured to receive power (and optionally communication information) and the remaining two portions are configured to deliver power (and optionally communication information). By contrast, in the case of a power insert connector only one of the portions is configured to deliver power (and optionally communication information, with the power/communication being delivered to the downstream portion of the trunk line), while the remaining two portions are configured to receive power and/or communication. Similar geometric considerations as described above may affect the choice of connector that is used.

Figure 8A:
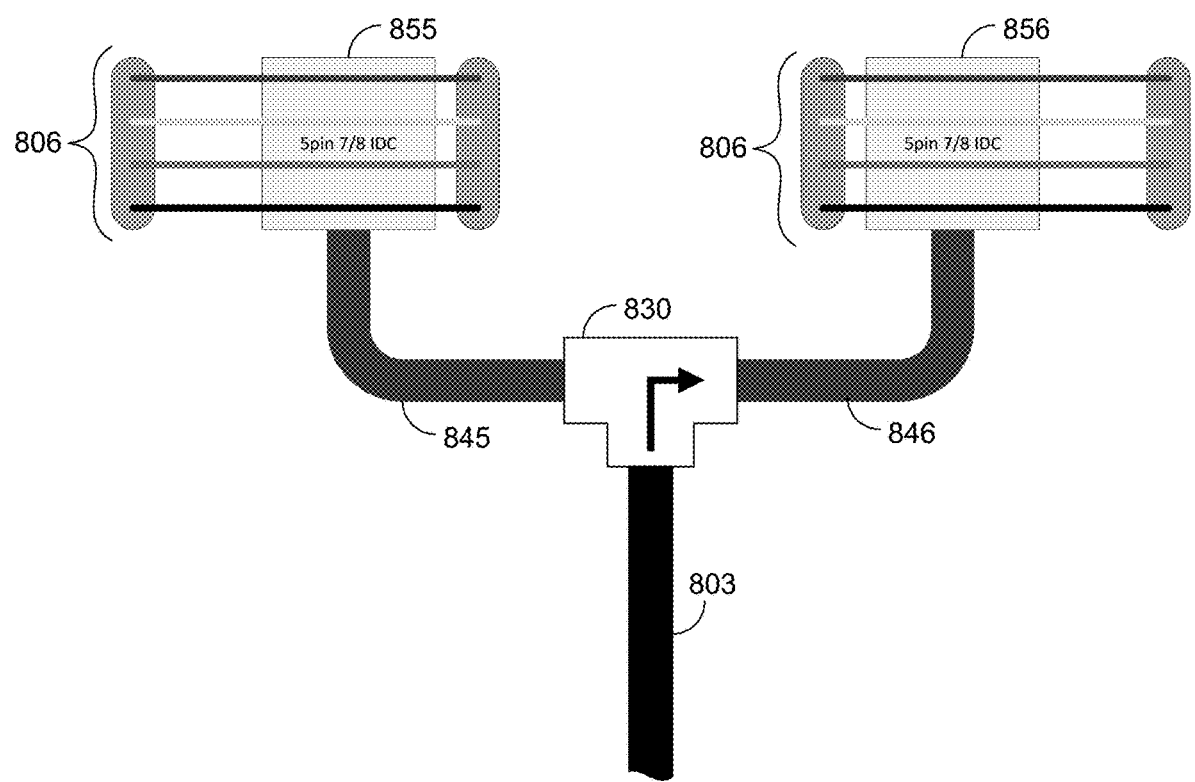
FIGS. 8A and 8B depict different methods for connecting a power insert line to a flat cable trunk line.

In certain cases where a trunk line is implemented as a flat cable, particular configurations may be used to connect a power insert line. FIG. 8A illustrates one method of installing a tee-shaped power insert connector where the trunk line is implemented as a flat cable. In this example, an upstream portion of the trunk line 806 is severed and terminated with a first insulation displacement connector 855 having 5 pins (two for power, two for communication, 1 for ground). The first insulation displacement connector 855 is connected to a first intermediate line 845, which feeds into a portion of a power insert connector 830. The power insert connector 830 includes another portion that connects with a second intermediate line 846. The second intermediate line 846 connects with a second insulation displacement connector 856, which is installed on a downstream portion of the trunk line 806. The second insulation displacement connector 856 is also a 5 pin connector in this example. The insulation displacement connectors 855 and 856 may be similar to the insulation displacement connectors described in relation to the drop line connectors discussed above. For instance, such connectors may include a front portion and a back portion that fit over the trunk line and pierce the insulation on the trunk line to thereby establish a reliable electrical connection.

The power insert connector 830 is also connected to a power insert line 803, which can thereby deliver power to the downstream portion of the trunk line 806. The first and second insulation displacement connectors 855 and 866 may be relatively large, for example having a diameter of about ⅞ inches. The first and second intermediate lines 845 and 846 may be round cables with 5 conductors therein (two for power, two for communication, one for ground).

Figure 8B:
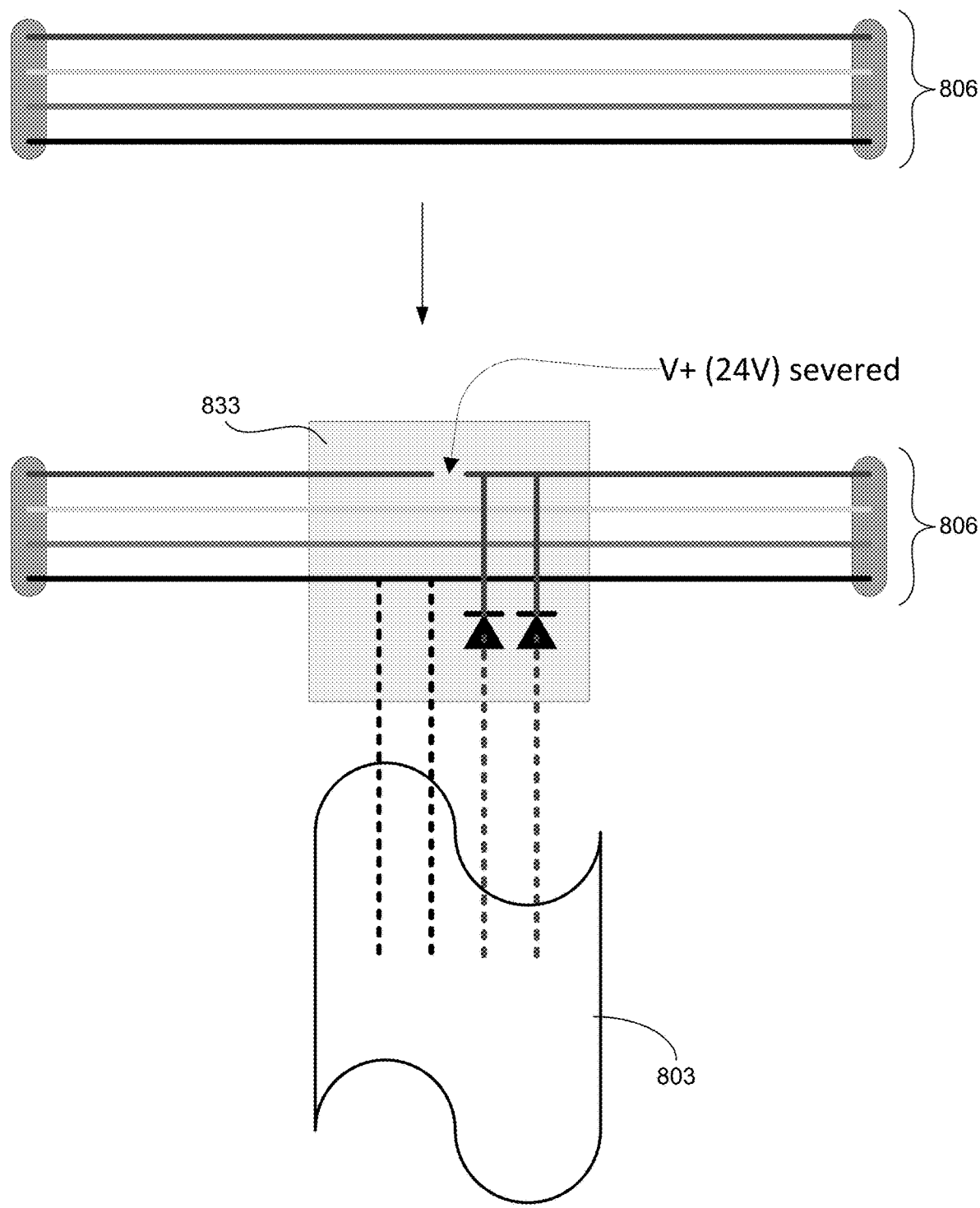

FIG. 8B illustrates another method of connecting a power insert line 803 to a trunk line 806. The top portion of FIG. 8B shows the trunk line 806 before the power insert line 803 is connected, and the bottom portion of FIG. 8B shows how the connection is made. With this method, a power insert insulation displacement connector 833 partially severs the trunk line 806 to connect the power insert line 803 to the trunk line 806. More specifically, the power insert insulation displacement connector 833 severs the V+ line internal to the device, thereby providing an electrical connection with the power insert line. The power insert connector, however it is implemented, may include diodes, as shown in FIG. 8B. The diodes may act to "OR" the two V+ conductors to effectively double the effective conductor gauge (2× the effective copper area and half the voltage drop). The diodes may also provide reverse polarity protection such that a misconnected power supply will not supply power.

C. Power/Communication Integration Connectors

In some embodiments, a power/communication integration connector may be used to combine two separate cables, one carrying power and one carrying communication information, such that both the power and communication information can pass downstream along a trunk line. Generally speaking, a power/communication integration connector includes three portions: one that receives power, one that receives communication information, and one that outputs both power and communication. For example, with reference to FIG. 4, separate cables 404 and 402 may be provided for communication and power distribution, respectively, between the control panel 401 and the most upstream portion of the trunk line 406. In other words, the communication cable 404 may distribute only communication/control information (not power), and the primary power insert cable 402 may distribute only power (not communication). In many cases a trunk line is designed to distribute both power and communication information. As such, the individual lines 402 and 404 may be connected with the trunk line 406 at a power/communication integration connector 408. The power and communication information can then be distributed downstream along the trunk line 406. While the power/communication integration connector is only shown in the context of a class 1 power distribution network, such connectors may also be provided in class 2 power distribution networks, as desired.

Power/communication integration connectors can have various forms. In some cases, the connectors are tees or wyes, as illustrated in FIGS. 7A and 7B. Although these figures were initially described in relation to drop line connectors, the power/communication integration connectors may also take these same shapes. Other shapes and connector configurations may also be used.

5. Terminators

In cases where a power distribution network also acts as a communication network, a terminator (also referred to as a termination resistor or terminating resistor) may be installed at the end of each trunk line to minimize communication reflections. The terminator may be installed between the CAN H and CAN L lines of the trunk line cable.

Figure 9:
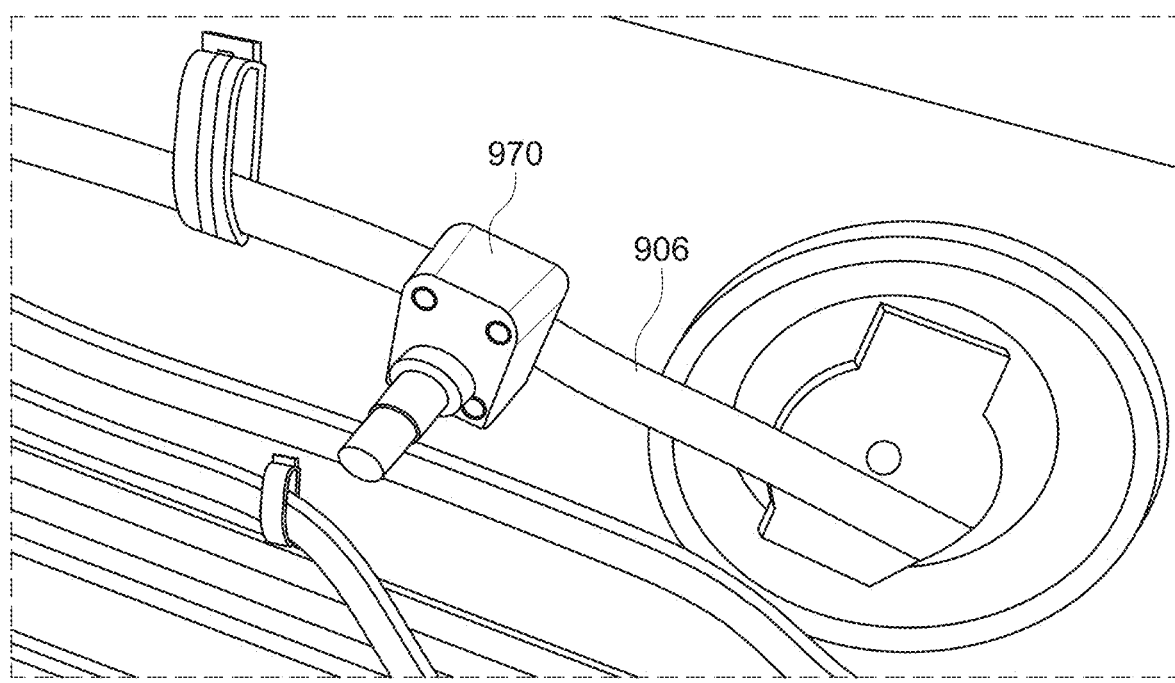
FIG. 9 depicts a terminator on a flat cable trunk line.

FIG. 9 presents a flat cable trunk line 906 having a terminator 970 installed thereon. In this example, the terminator includes a front portion and a back portion that fit over the trunk line, similar to the insulation displacement connectors described above. Terminators can also be installed on trunk lines that are implemented as more conventional round cable.

Any of the power distribution networks disclosed herein may include terminators on the end of each trunk line. The terminators are particularly useful where the trunk line is used to distribute communication information.

6. Energy Wells

Any of the power distribution networks described herein may further include one or more energy wells. Energy wells are local power storage units that are installed as a part of the power distribution network. Energy wells can be used to increase the maximum rate at which energy/power can be delivered over the power distribution network. For instance, where a power distribution network does not include any energy wells, the maximum rate at which energy/power can be delivered over the network may be limited by various factors including the power output of the control panel, line distances and related line losses, etc. These and other factors limit the number of electrochromic windows and window controllers that can be powered on each segment of the network. However, where the network is designed to include energy wells, the maximum power output of the network is no longer strictly limited by these factors because the energy wells can discharge as needed to provide extra power.

The use of energy wells allows for a power distribution network to be designed in a way that would appear to be "undersized" when the energy wells are not taken into account. In other words, in some embodiments, a network may include (a) a control panel and power insert lines/trunk lines configured in a way that would be insufficient to power simultaneous optical transitions on all the electrochromic windows on the network, and (b) energy wells that, together with the control panel and power insert lines/trunk lines, provide sufficient energy to drive simultaneous optical transitions on all the electrochromic windows on the network. The energy wells should have a capacity and discharge rate that is sufficient to make up for any deficit in power provided by the control panel (and remote power panel, if present). This capacity and rate will depend on many factors related to the design of the network including the number of windows being powered by the energy well, the power requirements of the windows and window controllers, the number of energy wells provided, distances and line losses, class 1 vs. class 2 designs, etc.

Energy wells may be installed in various positions on a power distribution network including, for example, on a trunk line, on a drop line, on a power insert line, on another line connected to the trunk line, etc. In some embodiments, one or more (in some cases all) of the window controllers are configured to include an energy well. In some such cases, each energy well may have a capacity and discharge rate that is sufficiently high to power at least a single optical transition on the associated electrochromic window.

Any type of local energy storage may be used for the energy wells. Examples include, but are not limited to, supercapacitors and batteries, whether in the form of uninterruptible power supplies (UPSs) or other forms. In a number of cases the energy wells may be configured to discharge at a voltage of about 24 V, though other values may be used as appropriate. In many cases the energy wells provide DC power. The energy well may be a class 1 or class 2 device.

Both energy wells and remote power panels can be used to provide energy to a trunk line. One difference is that the energy wells are energy storage units, whereas the remote power panels typically are not. Energy wells can charge via the power distribution network when the power collectively demanded by the windows and window controllers on the network is less than the power that can be delivered to them by the control panel and remote power panel (if present). If and when the power collectively demanded by the windows and window controllers exceeds the amount of power that can be delivered to them by the control panel and remote power panel, the energy well can begin to discharge to make up the difference. Then, when demand for power collectively subsides to a level below that which can be provided by the control panel and remote power panel, the energy wells can begin to recharge over the power distribution network.

Another difference between energy wells and remote power panels is that remote power panels receive power directly from a main building power supply, whereas energy wells typically receive power that has already been converted to a more useful form (e.g., a lower voltage, DC power).

Energy wells are further described in U.S. Provisional Patent Application No. 62/191,975, filed Jul. 13, 2015 and titled "POWER MANAGEMENT FOR ELECTROCHROMIC WINDOW NETWORKS," which is herein incorporated by reference in its entirety.

Installation Kits

As explained, various features of the power distribution networks described herein allow easy installation. Systems that are easy to install are suitable for the residential and small-scale commercial (not large office buildings) window market. One feature that can make installation easy is flat cable trunk line. As described above, flat cable trunk line is advantageous for several reasons. For example, the drop lines and power insert lines can be connected without completely severing the drop line. This allows for a single continuous trunk line to be installed. As a consequence, there is no need to pre-measure or estimate the relevant lengths of each portion of the trunk line (e.g., between adjacent drop line connectors and/or power insert connectors), nor to pre-cut the trunk line to such distances. This greatly simplifies installation and reduces the likelihood of making costly installation mistakes. Another benefit to flat cable trunk line is that the various connectors are very quick and easy to install, generally requiring no more than a screwdriver.

In some embodiments, an installation kit may be provided. Such kits provide many or all of the interchangeable components for implementing a power distribution network for electrochromic windows. In some cases, the installation kits may be sold at retailers such as home improvement stores. The home or business owner, or a contractor, may install the network in the home or business, in some cases retrofitting or extending an existing window network. The installation kit includes various components that are used in a power distribution network (which may also function as a communication network). Such components may include one or more control panels, one or more trunk lines (e.g., flat cable trunk lines), one or more drop line connectors (e.g., insulation displacement connectors), one or more drop lines (which may or may not be pre-connected to the drop line insulation displacement connectors), one or more window controllers, one or more terminators (in cases where the trunk line is used to distribute both power and communication information), and a set of instructions for configuring the network. In some implementations, the kit or certain components are packaged to facility sale and/or transportation. For example, connectors, control panels, and/or cables may be covered in bubble wrap.

The kit may also include the optically switchable windows such as electrochromic windows (e.g., installed in electrochromic IGUs or lites), though in various cases these may be provided separately, for example to ensure that the windows are properly sized for a particular application. In some cases, one or more of the windows provided with the kit are "in-fill" windows configured to be mounted in a cavity where an existing, non-optically switchable, window resides. See U.S. Provisional Patent Application No. 62/194,107, filed Jul. 17, 2015, which is incorporated herein by reference in its entirety.

In some cases a kit may further include power insert connectors such as insulation displacement connectors, as well as cable that can be used as a power insert line. Such cable may be the same as the trunk line cable, or it may be different. In one example where these cables are different, the power insert line cable may be capable of delivering only power, while the trunk line cable may be capable of delivering both power and communication.

Any one or more of the trunk line cable, the drop line cable, and the power insert cable may be designed or configured to permit connection without breaking the cable. As mentioned, such cable includes flat cable, hybrid cable (partially round and partially flat cable), and round cable that is capable of being manipulated to provide the conductors in a flat format at the locations where the connections are made.

The control panel included in the kit may have various features as described above in relation to FIGS. 6E and 6F. In some cases the control panel may be simpler, including for example (a) an AC/DC power converter for converting incoming AC building power to a more useful DC form for distributing along the power distribution network, (b) a voltage and/or current limiter for ensuring that the power distributed over the network does not exceed certain safety standards, and (c) one or more connection points for connecting to a trunk line and/or power insert line. The control panel provided in the kit may further have any one or more of the additional features described above in relation to a control panel. In certain embodiments, the control panel is relatively small, e.g., it has no dimension greater than about 30 inches. In certain embodiments, the control panel contains a class 2 power supply, and sometimes only one such power supply. In certain embodiments employing class 2 power supplies, the control panel does not include a protection module. In one example, the control panel further includes one or more network controllers and an optional master controller. In some examples, the control panel includes a dongle implementing a CAN Bus interface to combine the functions a master controller and a network controller. In various embodiments, the control panel does not contain any window controllers.

The number and lengths of the cables (trunk line, power insert lines, and drop lines), as well as the number and types of connectors in a kit is set to meet a particular market segment (e.g., single family homes versus apartment buildings or small commercial buildings). In one embodiment, the kit includes at least about 100 or 200 feet of flat cable trunk line, at least about X drop line insulation displacement connectors, at least about X drop lines (optionally pre-attached to the drop line insulation displacement connectors, and at least about X window controllers. X may be any integer, and in some embodiments is 1, about 4, about 8, about 10, about 15, or about 20. In another embodiment, the kit may include these same components, except that the drop lines may be provided together in a single line that can be cut to an appropriate length for each individual drop line. Kits of different sizes can have trunk lines of different lengths, with larger kits (e.g., those designed to accommodate a relatively greater number of electrochromic windows) having longer trunk lines provided.

The kits may be supplemented by individual components that may be purchased separately, as needed for a particular application.

What is claimed is:
1. A signal distribution network for providing signals to a plurality of optically switchable windows in a building, the signal distribution network comprising:
    a control panel comprising a signal supply and one or more ports connected to the signal supply;
    a primary insert line connected to the one or more ports of the control panel;
    a secondary insert line connected to the one or more ports of the control panel;
    a trunk line connected to the primary insert line at a first location of the trunk line and connected to the secondary insert line at a second location of the trunk line, the second location different from the first location, the trunk line comprising a plurality of conductors;
    a plurality of drop lines connected to the trunk line, each drop line configured to provide signals from the trunk line to one or more of the optically switchable windows; and
    a plurality of connectors connected between the plurality of drop lines and the trunk line, each connector of the plurality of connectors providing an electrical path between the trunk line and a respective one of the plurality of drop lines in a manner that does not sever the conductors of the trunk line.

2. The signal distribution network of claim 1, wherein the trunk line comprises flat cable portions at the connectors.

3. The signal distribution network of claim 1, wherein the trunk line is a flat cable.

4. The signal distribution network of claim 1, wherein the connectors comprise insulation displacement connectors.

5. The signal distribution network of claim 1, wherein:
the primary insert line is a primary power insert line,
the secondary insert line is a secondary power insert line, and
the second location is between the first location and a third location of an optically switchable window.

6. The signal distribution network of claim 1, wherein the network has fewer insert lines than optically switchable windows.

7. The signal distribution network of claim 1, further comprising a plurality of window controllers coupled between the optically switchable windows and the drop lines, wherein the window controllers comprise circuitry for delivering electrical power to the optically switchable windows and driving optical transitions of the optically switchable windows.

8. The signal distribution network of claim 7, wherein the window controllers further comprise instructions for ramping and holding electrical power to the optically switchable windows to drive the optical transitions.

9. The signal distribution network of claim 1, wherein the optically switchable windows comprise electrochromic devices on transparent substrates.

10. The signal distribution network of claim 1, wherein the signals provided to the one or more optically switchable windows provide class 2 power.

11. A kit for installing a signal distribution network for providing signals to a plurality of optically switchable windows in a building, the kit comprising:
a control panel comprising a signal supply and one or more ports connected to the signal supply;
a primary insert line configured to be connected to the one or more ports of the control panel;
a secondary insert line configured to be connected to the one or more ports of the control panel;
a trunk line configured to be connected to the primary insert line at a first location of the trunk line and configured to be connected to the secondary insert line at a second location of the trunk line, the second location different from the first location, the trunk line comprising a plurality of conductors;
a plurality of drop lines configured to be connected to the trunk line, each drop line configured to be connected to one or more of the optically switchable windows to provide signals from the trunk line to the one or more optically switchable windows; and
a plurality of connectors configured to be connected between the plurality of drop lines and the trunk line, each connector of the plurality of connectors configured to provide an electrical path between the trunk line and a respective one of the plurality of drop lines.

12. The kit of claim 11, wherein the connectors are configured to provide the electrical path between the trunk line and the drop lines in a manner that does not sever the conductors of the trunk line.

13. The kit of claim 11, wherein the trunk line comprises flat cable portions at locations where the connectors can be attached.

14. The kit of claim 11, wherein the trunk line is a flat cable.

15. The kit of claim 11, wherein the connectors comprise insulation displacement connectors.

16. The kit of claim 11, wherein the secondary insert line is a secondary power insert line.

17. The kit of claim 11, wherein the control panel has no side with a dimension greater than about 30 inches.

18. The kit of claim 11, wherein the control panel signal supply is a class 2 power supply.

19. The kit of claim 11, further comprising the one or more optically switchable windows.

20. The kit of claim 19, wherein the one or more optically switchable windows comprise one or more electrochromic devices on one or more transparent substrates.

21. The signal distribution network of claim 1, wherein the signals include power and/or communications.

22. The kit of claim 11, wherein the signals include power and/or communications.

23. The signal distribution network of claim 1, wherein one or more of the lines comprises insulation and shielding.

24. The kit of claim 11, wherein one or more of the lines comprises insulation and shielding.

* * * * *